United States Patent [19]

Ogasawara et al.

[11] Patent Number: 5,402,251
[45] Date of Patent: Mar. 28, 1995

[54] IMAGE READING APPARATUS WITH SEPARATED SCANNER

[75] Inventors: Hiroshi Ogasawara; Kazutoshi Shibuya; Takeshi Fuchigami, all of Tokyo, Japan

[73] Assignee: Kabushiki Kaisha Toshiba, Kawasaki, Japan

[21] Appl. No.: 918,593

[22] Filed: Jul. 24, 1992

[30] Foreign Application Priority Data

Jul. 26, 1991 [JP] Japan .................. 3-187633
Nov. 19, 1991 [JP] Japan .................. 3-303301
Dec. 16, 1991 [JP] Japan .................. 3-332115

[51] Int. Cl.⁶ .................. H04N 1/04; H04N 1/24
[52] U.S. Cl. .................. 358/473; 358/476
[58] Field of Search .................. 358/400, 401, 443, 471, 358/473, 474, 476, 494, 496; 379/100

[56] References Cited

U.S. PATENT DOCUMENTS

| | | | |
|---|---|---|---|
| 4,639,790 | 1/1987 | Kusaka .................. | 358/293 |
| 4,652,937 | 3/1987 | Shimura et al. .................. | 358/286 |
| 4,707,747 | 11/1987 | Rockwell, III .................. | 358/294 |
| 4,797,544 | 1/1989 | Montgomery .................. | 358/293 |
| 4,837,812 | 6/1989 | Takahashi et al. .................. | 358/257 |
| 4,962,526 | 10/1990 | Kotani et al. .................. | 358/476 |
| 5,045,953 | 9/1991 | Kotani et al. .................. | 358/473 |
| 5,172,243 | 12/1992 | Hayashi et al. .................. | 358/400 |

Primary Examiner—Vit W. Miska
Attorney, Agent, or Firm—Finnegan, Henderson, Farabow, Garrett & Dunner

[57] ABSTRACT

In an image reading apparatus used for a copying machine and a facsimile device, an image reading scanner is separated from a main device of the apparatus in order to increase the freedom of the scanning direction of the original and increase the operability of the scanner. The hand scanner is moved by a hand of an operator on the original and reads the image data line by line. The image data representing a dot pattern is transmitted to the main device as an on/off modulated optical signal through a modem. The main device receives the optical signal and demodulates the signal using a modem to reproduce the image data obtained by the hand scanner.

32 Claims, 16 Drawing Sheets

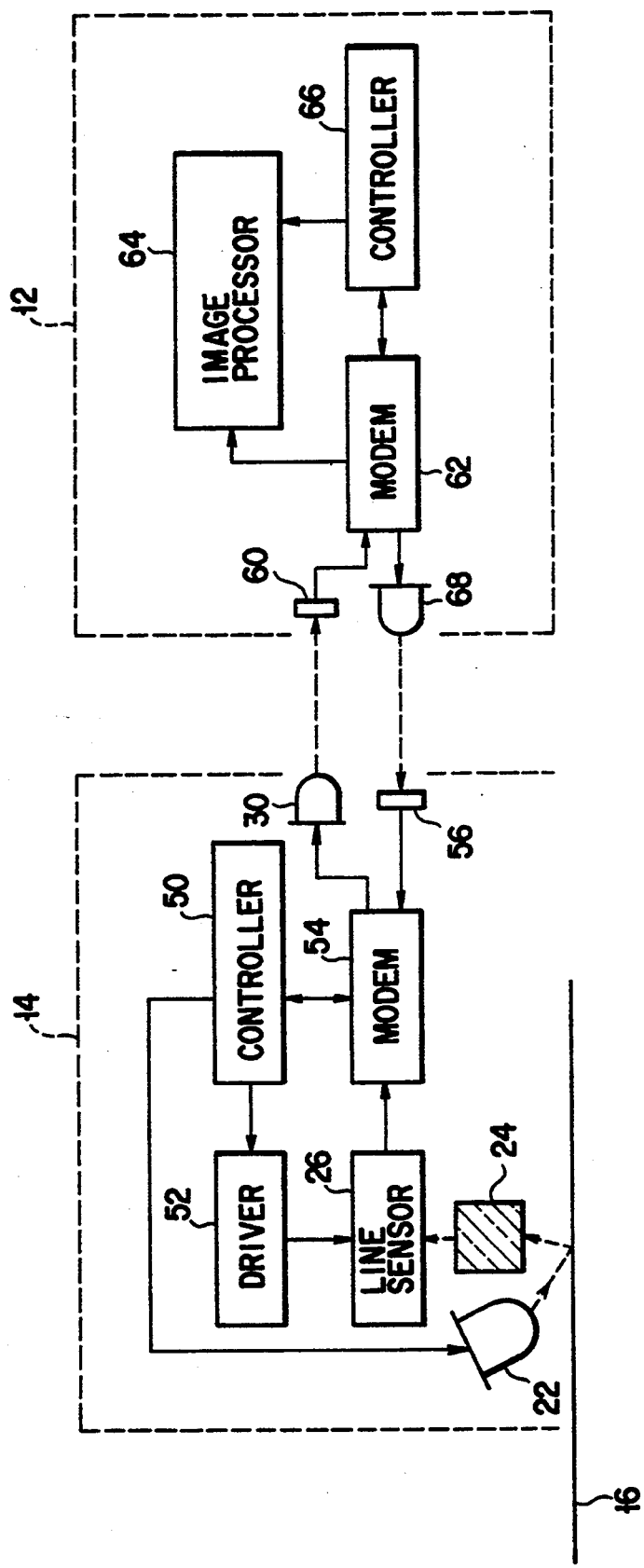
F I G. 5

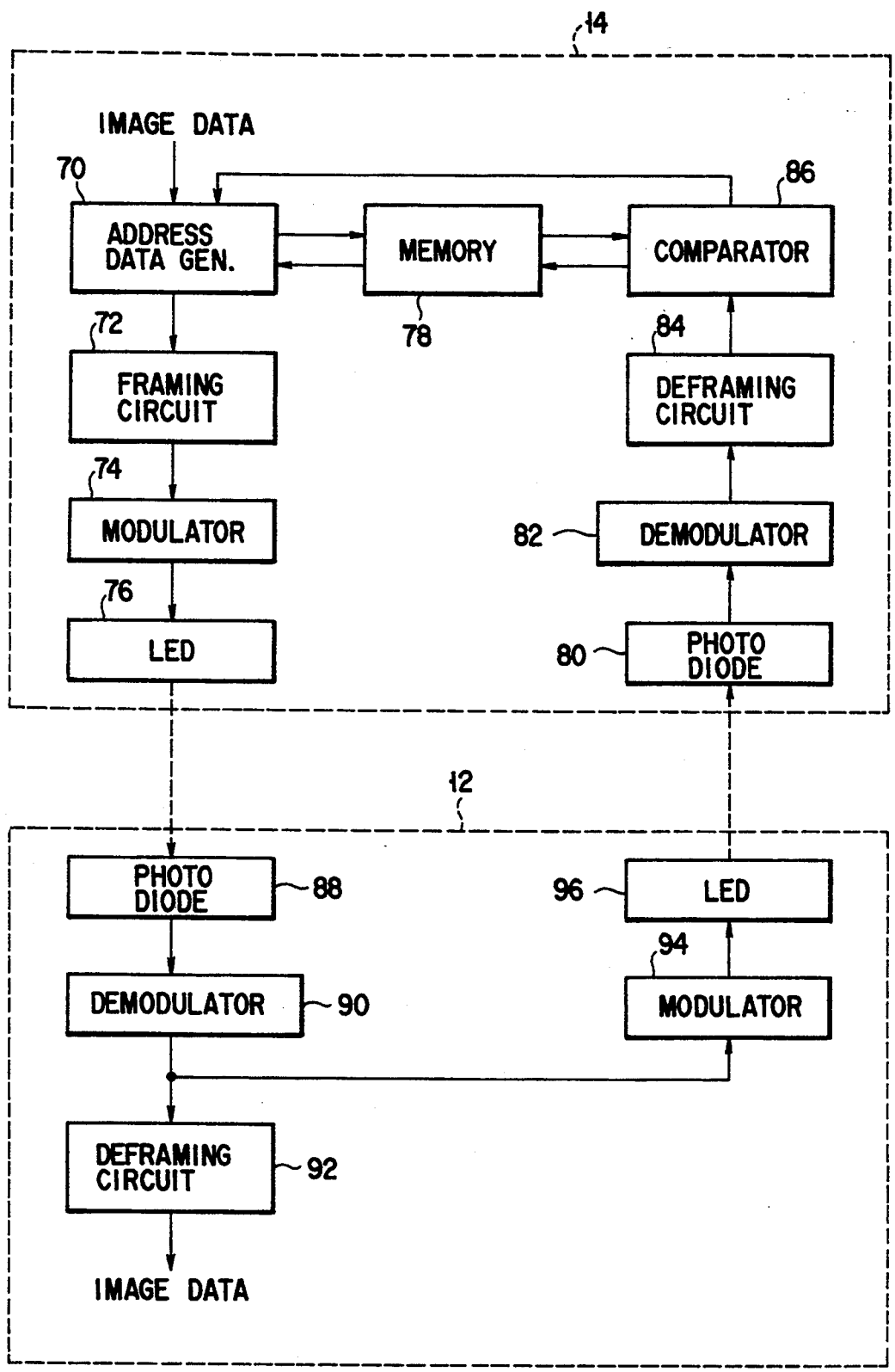
F I G. 7

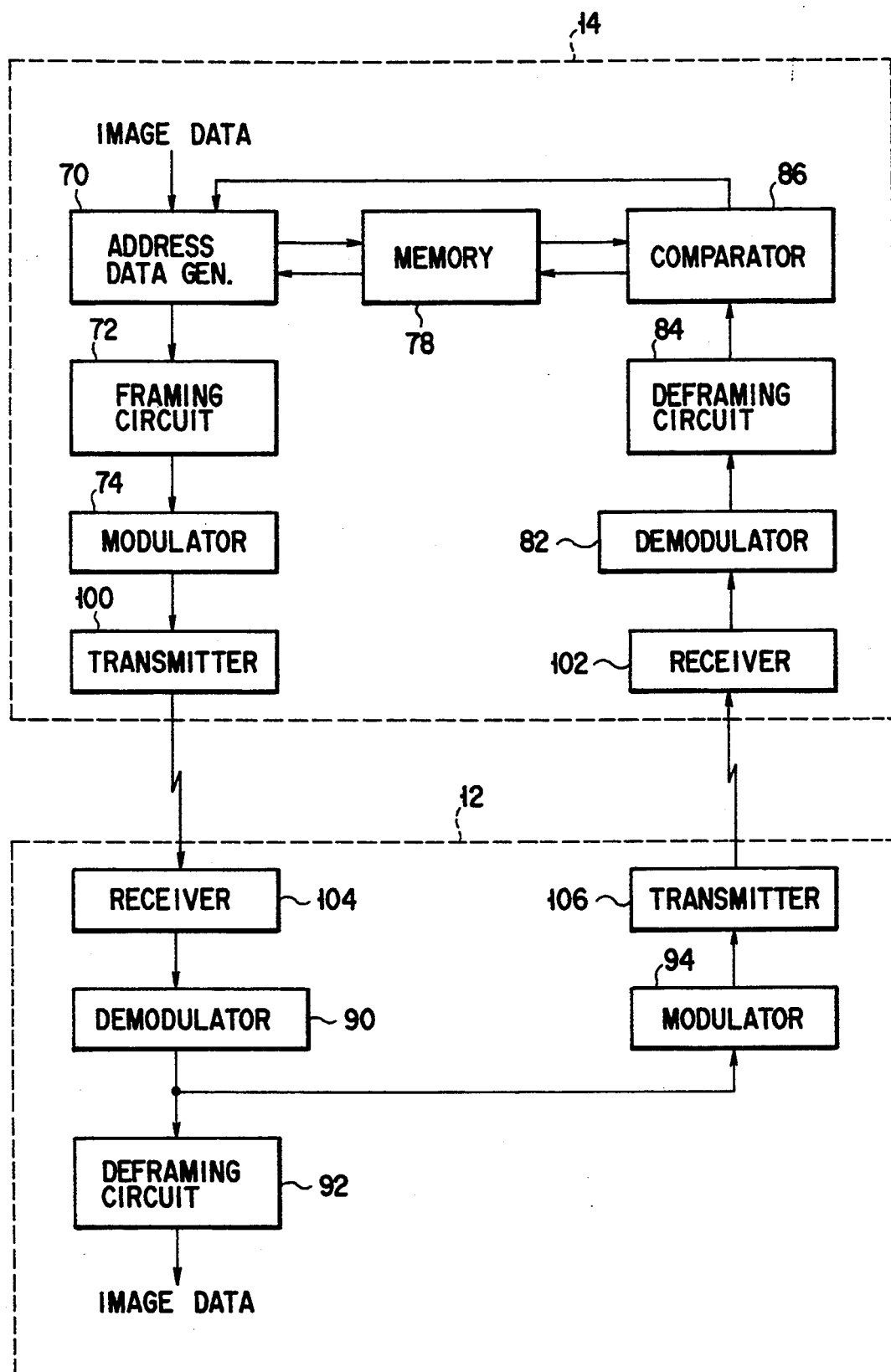
F I G. 9

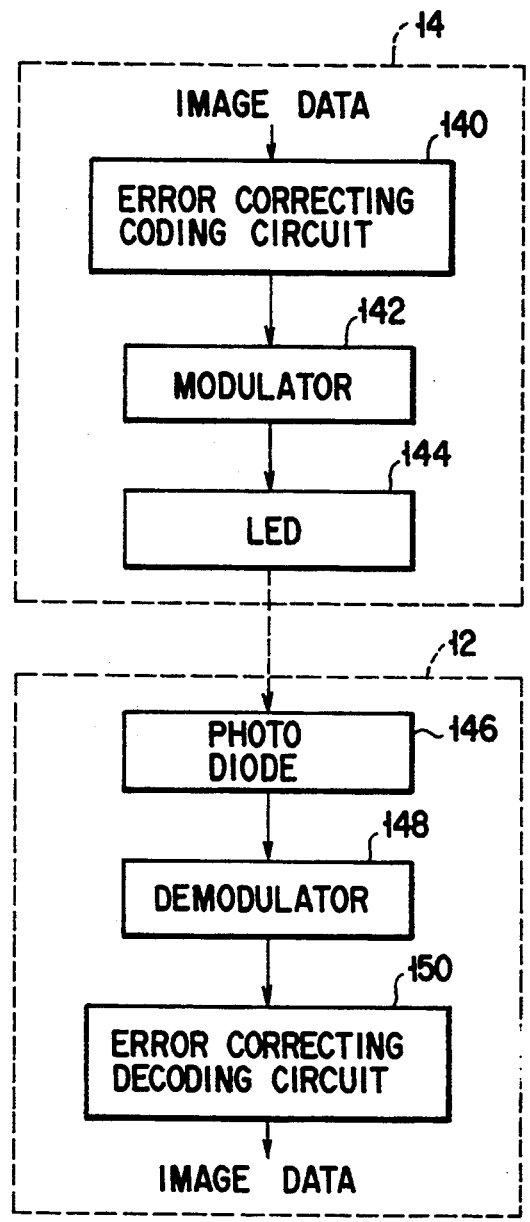
F I G. 15
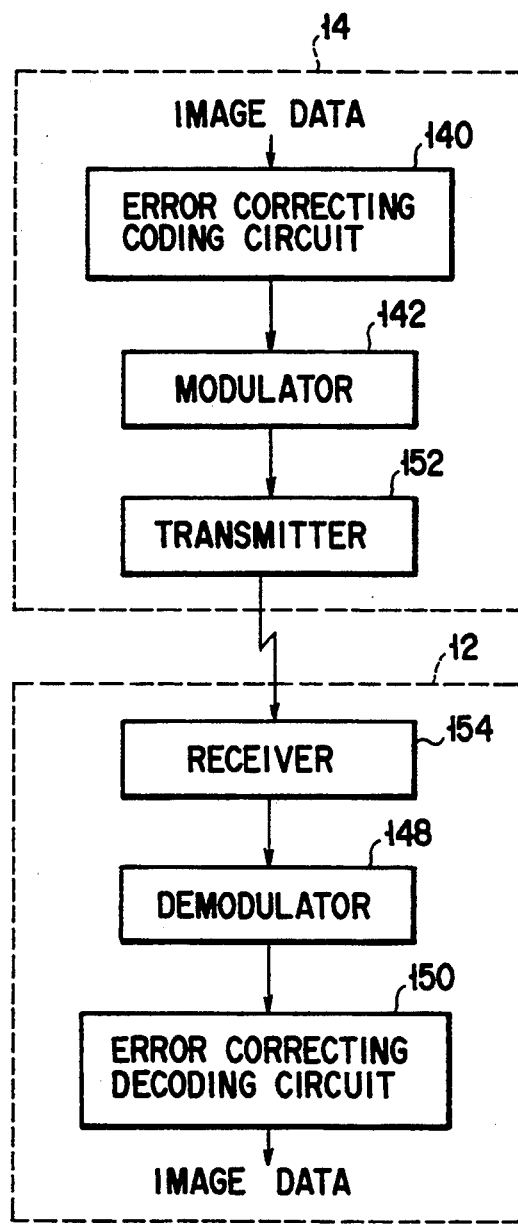
F I G. 16

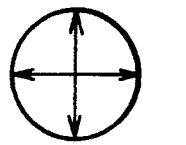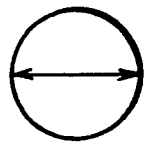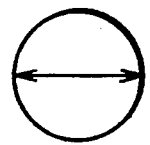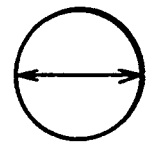

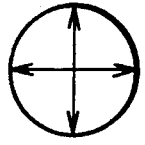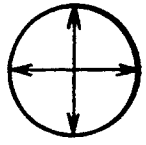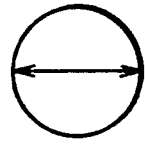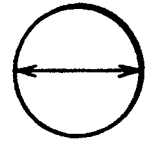

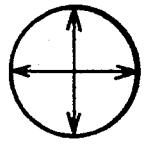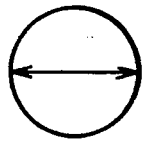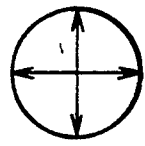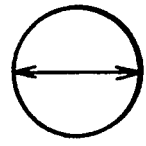
FIG. 20A  FIG. 20B  FIG. 20C  FIG. 20D

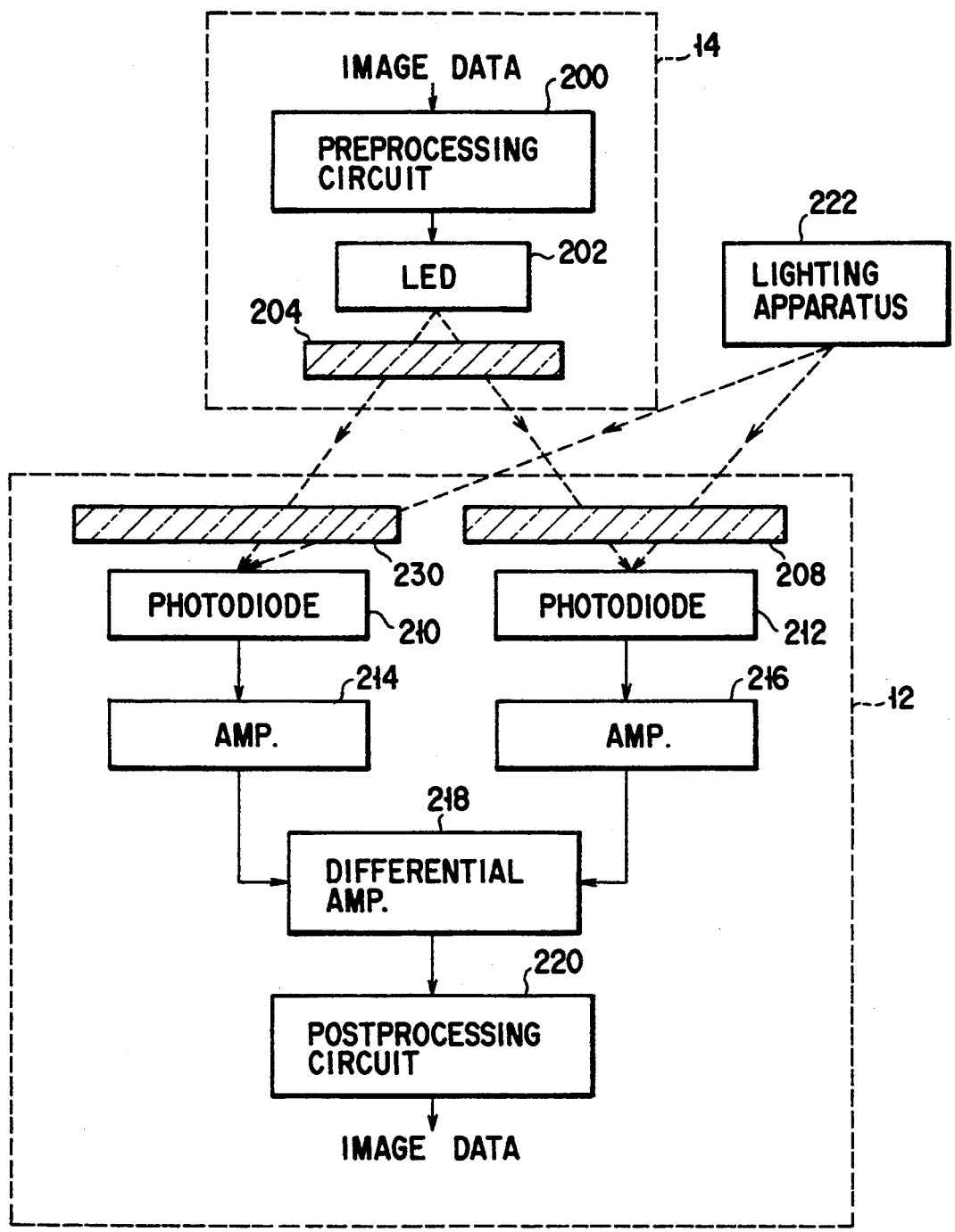
F I G. 21

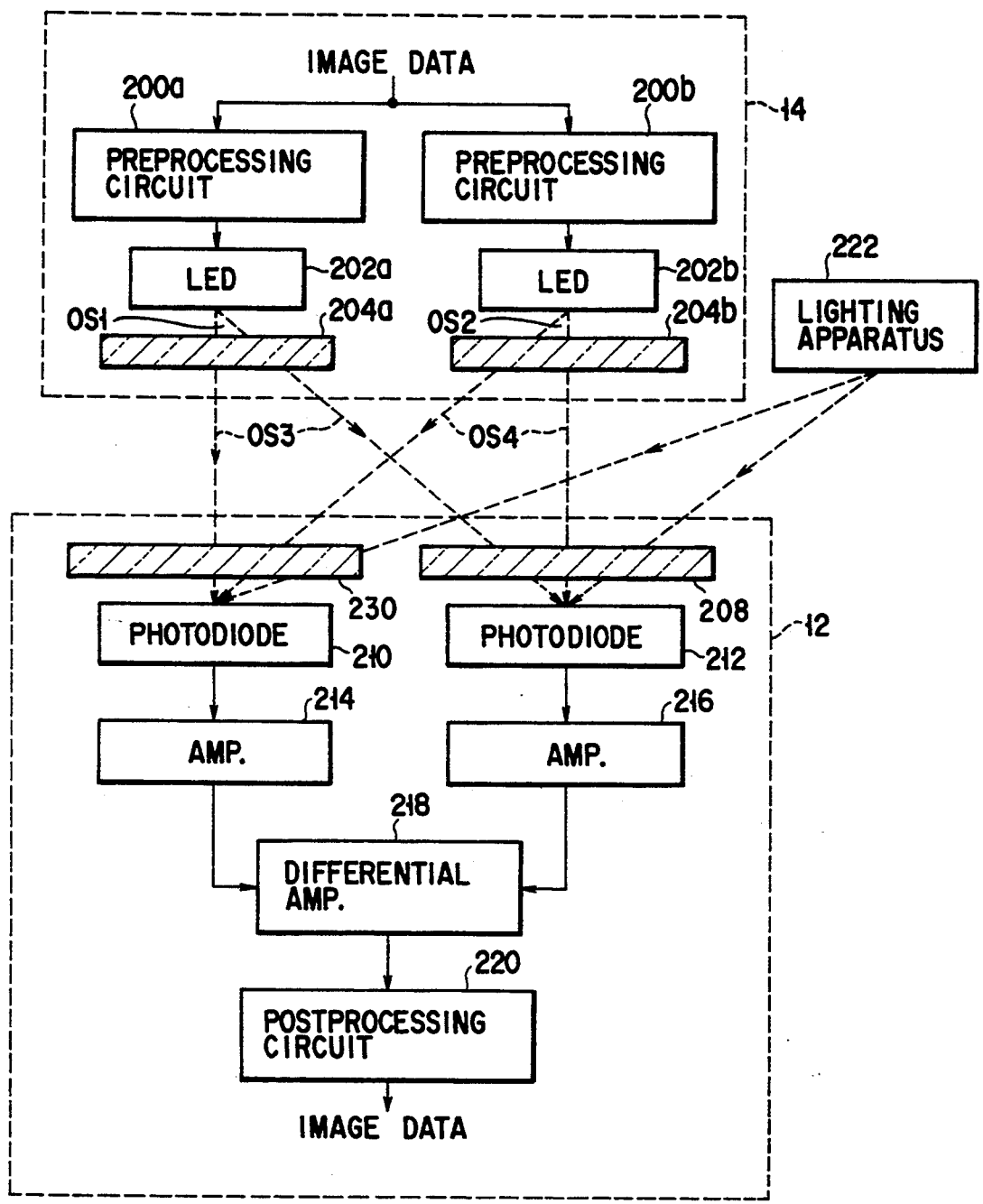
F I G. 22

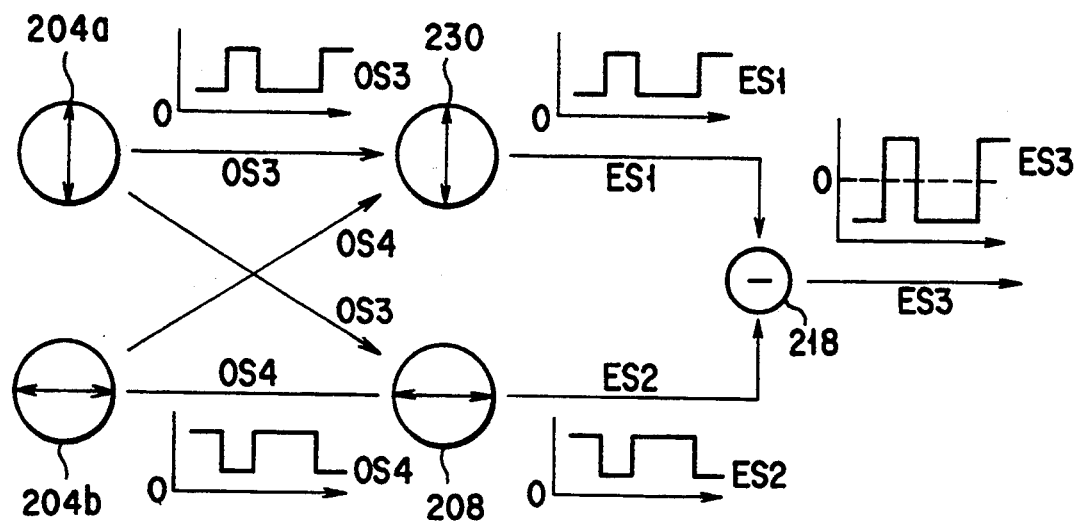
F I G. 23
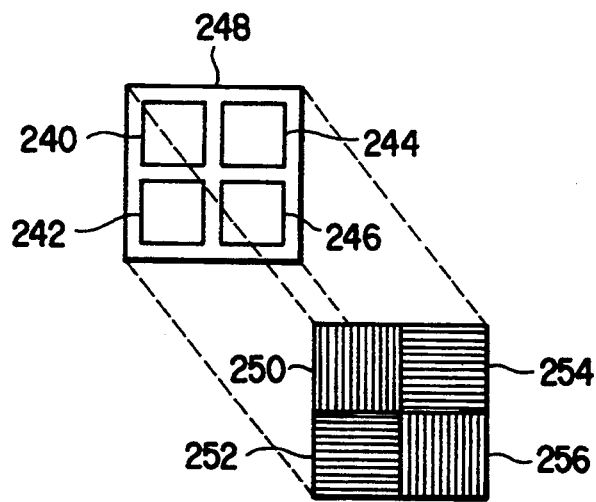
F I G. 24

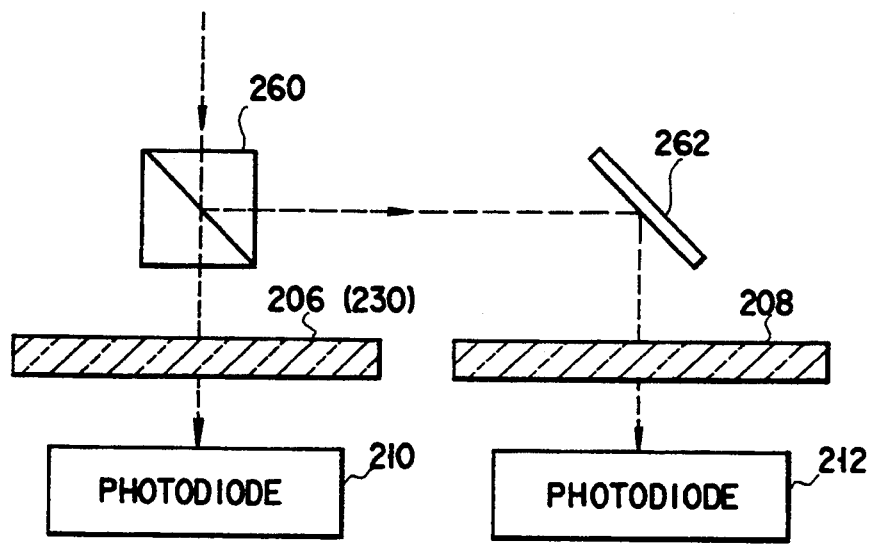
F I G. 25
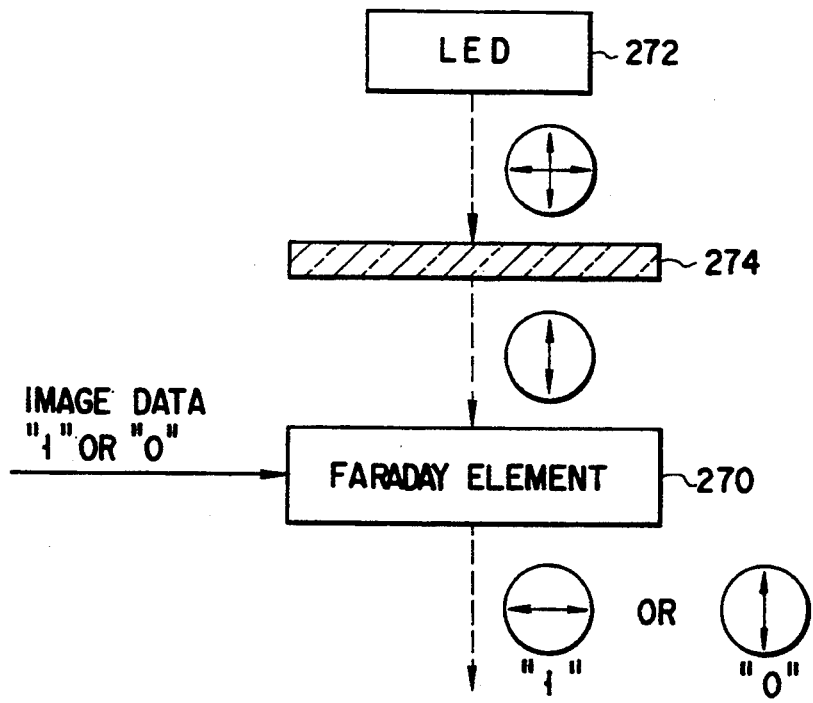
F I G. 26

IMAGE READING APPARATUS WITH SEPARATED SCANNER

BACKGROUND OF THE INVENTION

1. Field of the Invention

The present invention relates to an image reading apparatus in which an image reading scanner is separated from a main device of the apparatus.

2. Description of the Related Art

This type of image reading apparatus is used for a copying machine and a facsimile device. A conventional apparatus is shown in FIG. 1. A hand scanner 4 which is manually moved on an original 6 by a user is provided independent on a main device 2 of the apparatus. The main device 2 includes an image processor or the like. The scanner 4 and the main device 2 are connected to each other by means of a curl cord 8. It is possible to freely scan the scanner 4 within a range determined by the length of the curl cord 8. Image data read by the scanner 4 is transmitted to the main device 2 through the curl cord 8. Thus, the main device 2 can read the image in the same manner as an image reading apparatus incorporating the scanner therein.

The reason that the scanner is separated from the main device is to increase the freedom of the scanning direction of the original and increase the operability of the scanner. However, the movement of the hand scanner is limited by the length of the curl cord. For example, when the hand scanner is to be moved beyond the length of the cord, the scanner may be pulled by the cord so that the scanner will be tilted. As a result, the freedom of the scanning direction of the original and the operability of the scanner cannot be satisfactory increased.

SUMMARY OF THE INVENTION

Accordingly, it is an object of the present invention to provide an image reading apparatus with a separated scanner which can freely scan an original without being disturbed by a cord connecting the scanner to a main device and can increase the operability of the scanner.

According to one aspect of the present invention, there is provided an image reading apparatus comprising scanner means for reading image data of an original, and a main device for processing the image data supplied from said scanner means, said scanner means comprising means for emitting a polarized light in accordance with the image data, a signal component of a first polarization angle having a level higher than a signal components of other polarization angles, and said main device comprising first receiver means for generating a first electrical signal having a level corresponding to an amount of incident light regardless of a polarization characteristic, an optical system in which a transmittance for a second polarizing angle is higher than a transmittance for other polarizing angles, second receiving means for generating a second electrical signal having a level corresponding to an amount of light transmitted through said optical system, means for amplifying at least one of the first and second electrical signals by first and second amplification factors such that a difference between the first and second amplification factors has a predetermined level for compensating for an attenuation amount of light transmitted through said optical system, and level difference calculating means for calculating a level difference between the first and second electrical signals upon amplification by said amplifying means.

According to another aspect of the present invention, there is provided an image reading apparatus comprising scanner means for reading image data of an original, and a main device for processing the image data supplied from said scanner means, said scanner means comprising means for emitting a polarized light in accordance with the image data, a signal component of a first polarization angle having a level higher than a signal components of other polarization angles, and said main device comprising a first optical system in which a transmittance for a second polarizing angle is higher than a transmittance for other polarizing angles, first receiver means for generating a first electrical signal having a level corresponding to an amount of light transmitted through said first optical system, a second optical system in which a transmittance for the second polarizing angle differs from the transmittance for the second polarizing angle of said first optical system and a transmittance for a non-polarized light equals to the transmittance for the non-polarized light said first optical system, second receiving means for generating a second electrical signal having a level corresponding to an amount of light transmitted through said second optical system, and level difference calculating means for calculating a levels difference between the first and second electrical signals.

According to still another aspect of the present invention, there is provided an image reading apparatus comprising scanner means for reading image data of an original, and a main device for processing the image data supplied from said scanner means, said scanner means comprising means for emitting a polarized light in accordance with the image data, a signal component of a first polarization angle having a level higher than a signal components of other polarization angles, and said main device comprising a first optical system in which a transmittance for a second polarizing angle is higher than a transmittance for other polarizing angles, first receiver means for generating a first electrical signal having a level corresponding to an amount of light transmitted through said first optical system, a second optical system in which a transmittance for a third polarizing angle is higher than a transmittance for other polarizing angles, second receiving means for generating a second electrical signal having a level corresponding to an amount of light transmitted through said second optical system, and level difference calculating means for calculating a level difference between the first and second electrical signals.

According a further aspect of the present invention, there is provided an image reading apparatus comprising scanner means for reading image data of an original, and a main device for processing the image data supplied from said scanner means, said scanner means comprising first means for emitting a polarized light in accordance with the image data, a signal component of a first polarization angle having a level higher than a signal components of other polarization angles, and second means for emitting a polarized light in accordance with the image data, a signal component of a second polarization angle having a level higher than a signal components of other polarization angles, and said main device comprising a first optical system in which a transmittance for a third polarizing angle is higher than a transmittance for other polarizing angles, first receiver means for generating a first electrical signal having a level corresponding to an amount of light transmitted through said first optical system, a second optical system in which a transmittance for a fourth polarizing angle is higher than a transmittance for other polarizing angles, second receiving means for generating a second electrical signal having a level corresponding to an amount of light transmitted through said second optical system, and level difference calculating means for calculating a level difference between the first and second electrical signals.

According a still further aspect of the present invention, there is provided an image reading apparatus comprising scanner means for reading image data of an original, and a main device for processing the image data supplied from said scanner means, said main device connected to said scanner means through a wireless channel, said main device comprising means for returning the image data transmitted from said scanner means to said scanner means, and said scanner means comprising means for storing the image data transmitted to said main device, means for comparing the image data returned from said main device and the image data stored in said storing means, and means for retransmitting the image data stored in said storing means when said comparing means detects non-coincidence of the image data.

According a still further aspect of the present invention, there is provided an image reading apparatus comprising scanner means for reading image data of an original, and a main device for processing the image data supplied from said scanner means, said scanner means comprising means for transmitting the image data with address data and an error correcting flag through a wireless channel, and means for storing the image data and the address data, said main device comprising means for detecting a transmission error of the image data transmitted from said scanner means based on the error correcting flag, and means for transmitting a retransmission request signal to said scanner means when said detecting means detects the transmission error.

According to still another aspect of the present invention, there is provided an image reading apparatus comprising scanner means for reading image data of an original, and a main device for processing the image data supplied from said scanner means, said scanner means comprising means for transmitting the image data after performing an error correcting coding through a wireless channel, and said main device comprising means for performing an error correcting decoding on the image data transmitted from said scanner means.

According a further aspect of the present invention, there is provided an image reading apparatus comprising scanner means which is manually moved on an original for reading image data of the original, and a main device for processing the image data supplied from said scanner means, said scanner means comprising means for transmitting the image data to said main device through a wireless channel, and said main device comprising means for receiving the image data transmitted from said scanner means trough the wireless channel.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5 is a block diagram illustrating the electrical arrangement of the first embodiment;

FIG. 7 is a block diagram illustrating a second embodiment of the image reading apparatus according to the present invention;

FIG. 9 is a block diagram illustrating a third embodiment of the image reading apparatus according to the present invention;

FIG. 15 is a block diagram illustrating a sixth embodiment of the image reading apparatus according to the present invention;

FIG. 16 is a block diagram illustrating a seventh embodiment of the image reading apparatus according to the present invention;

FIGS. 20A to 20D show the polarization states of incident light, optical system, and transmitted light;

FIG. 21 is a block diagram illustrating a ninth embodiment of the image reading apparatus according to the present invention;

FIG. 22 is a block diagram illustrating a tenth embodiment of the image reading apparatus according to the present invention;

FIG. 23 illustrates a signal processing operation in the main device of the tenth embodiment;

FIG. 24 shows a modification of an arrangement of the photodiodes of the tenth embodiment;

FIG. 25 illustrates a modification of an optical system of the eighth to tenth embodiments; and FIG. 26 shows a modification of a light transmitting portion of the tenth embodiment.

DETAILED DESCRIPTION OF THE PREFERRED EMBODIMENTS

A preferred embodiment of an image reading apparatus with a separated scanner according to the present invention will now be described with reference to the accompanying drawings.

Figure 1:
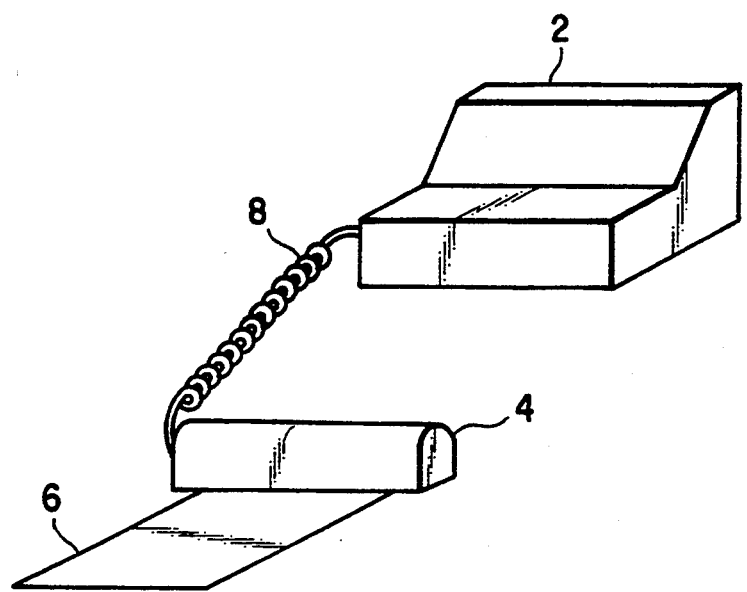
FIG. 1 shows a conventional image reading apparatus with a separated scanner.
Figure 2:
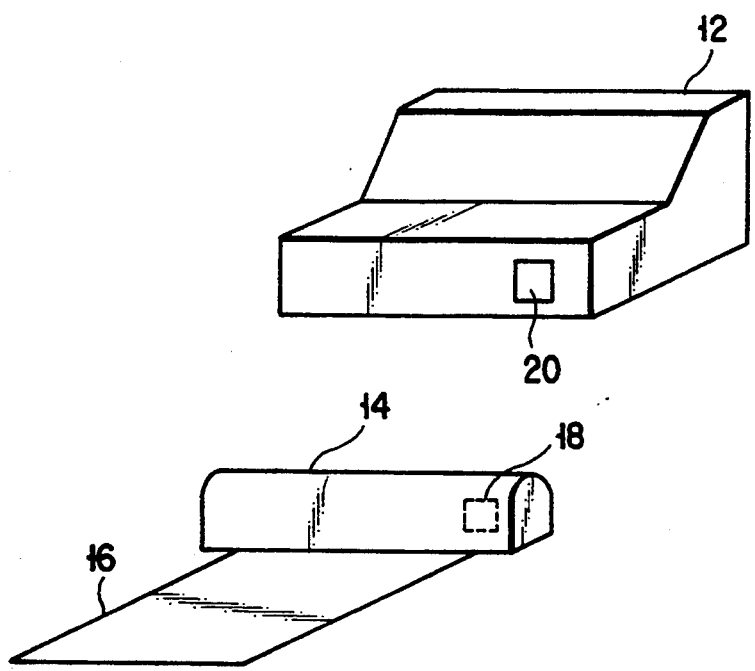
FIG. 2 is a schematic view of a first embodiment of the image reading apparatus with a separated scanner according to the present invention.

FIG. 2 shows a first embodiment. The first embodiment is similar to the prior art shown in FIG. 1 in that a hand scanner 14 is separated from a main device 12. However, the first embodiment differs from the prior art in that the scanner 14 is not connected to the main device 12 via a connecting wire, such as the curl cord 8, but by means of a wireless connection medium, such as light or electromagnetic wave. A system using light and a system using electromagnetic wave have the similar construction. However, the system using light will be described first.

There is provided a transmission window 18 for emitting an optical signal to be transmitted to the main device 12 in a surface of a housing of the hand scanner 14, which faces the main device 12. The hand scanner 14 scans an original 16 line by line. There is provided a reception window 20 for receiving the optical signal transmitted from the scanner 14 in a surface of a housing of the main device 12, which faces the hand scanner 14.

Figure 3:
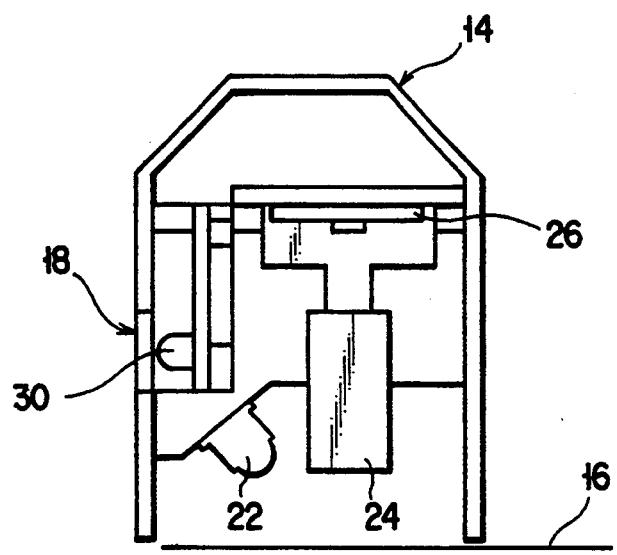
FIG. 3 shows an internal structure of the scanner of the first embodiment.

As shown in FIG. 3, the hand scanner 14 includes a light source 22 for illuminating the original 16, a line image sensor (e.g., CCD) 26 to which a reflected light from the original 16 through an objective lens 24 and which reads the image of the original 16, and a light emitting element 30 such as an infrared LED (light emitting diode) for transmitting as an optical signal, which represents the image read by the image sensor, through the transmission window 18.

Figure 4:
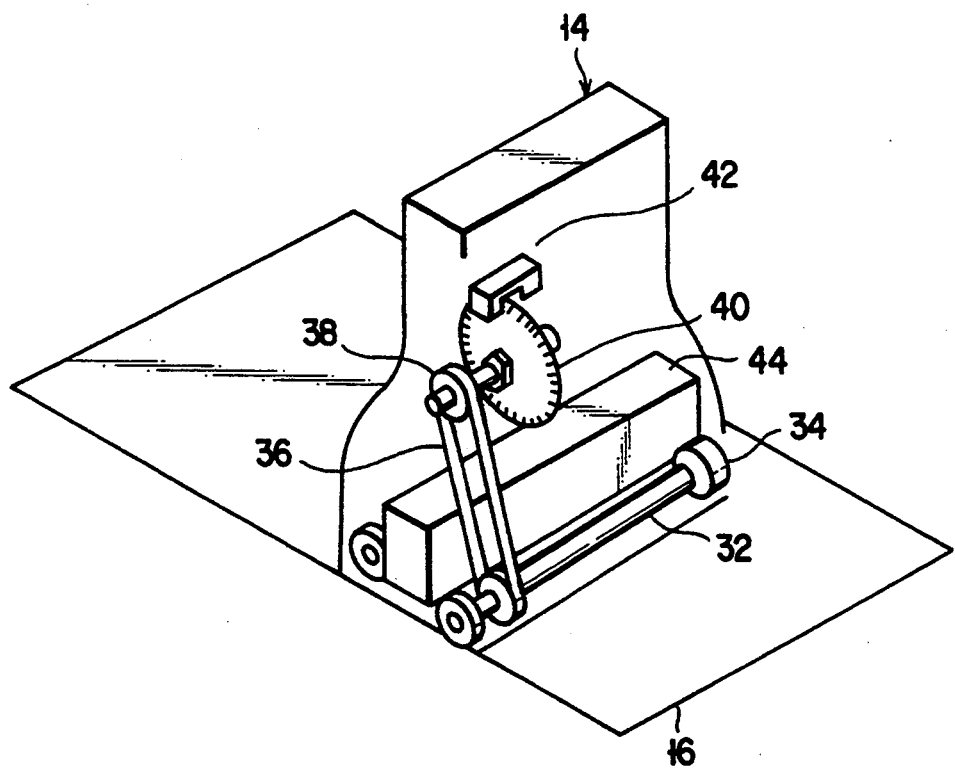
FIG. 4 is a perspective view of a rotary encoder for detecting a movement of the scanner of the first embodiment.

Further, as shown in FIG. 4, the hand scanner 14 includes a rotary encoder for detecting a moving velocity (scanning speed in a subscanning direction) of the hand scanner 14. A rotatable shaft 32 is provided under a line sensor unit 44 including the light source 22, line sensor 26, etc. and a roller 34 is fixed to the shaft 32. The diameter of the roller 34 is determined in accordance with the scanning pitch in the subscanning direction. That is, if the roller 34 is rotated by a predetermined angle when the scanner 14 is positioned at a given scanning line, the scanner 14 is positioned at an adjacent scanning line. The lower end of the roller 34 is slightly lower than the lower end of the scanner 14 so that the roller 34 can be smoothly rotated on the original 16.

The rotating angle of the roller 34 is detected by a rotary encoder. The rotary encoder 34 is formed of an encoding plate 40 shaped like a disk having a plurality of slits equally spaced about the periphery of the disk and a detector 42 for detecting the slits of the encoding plate 40. The encoding plate 40 is rotated in synchronism with the roller 34 by means of a pulley 38 and a belt 36. Therefore, during the movement or scanning of the scanner 14 on the original 16, a pulse signal is generated from the detector 42 upon every movement of the scanner by a predetermined length. The image of the original can be read by scanning line by line of a constant pitch by using the pulse signal as a sampling signal of the line sensor 26.

FIG. 5 is a block diagram showing an arrangement of the electrical components of the first embodiment. The hand scanner 14 includes a controller 50 for supplying a control signal to the light source 22 to illuminate the original 16. The image data of the original 16 is incident on the line sensor 24 through the objective lens 24. The line sensor 26 is driven by a driver 52 to which a control signal is supplied from the controller 50. The pulse signal generated from the detector 42 shown in FIG. 4 is supplied to the controller 50 as a sampling timing signal. The output of the line sensor 26 is supplied to an LED 30 acting as a light transmitting element through a modem 54 controlled by the controller 50. The modem 54 supplies to the LED 30, the image data which is on/off modulated by the image data of the original. The LED 30 is turned on when the image data is "1" (black dot) and off when the image data is "0" (white dot). Thus, the dot information of the image is transmitted from the hand scanner 14 to the main device 12 as light. To perform a light transmission of the reverse direction (from the main device 12 to the hand scanner 14), a light receiving element 56 such as a photodioide is provided in the hand scanner 14. The output signal of the photodiode 56 is supplied to the controller 50 through the modem 54. The signal transmitted from the main device 12 to the hand scanner 14 includes a control signal of the parts of the hand scanner 14.

The main device 12 includes a light receiving element 60 such as a photodioide for receiving the light emitted from the LED 30. The output signal of the photodiode 60 is supplied to an image processor 64 through a modem 62. A controller 66 is connected to the modem 62 and the image processor 64. The above control signal is supplied from the controller 66 through the modem 62 and a light emitting element 68 such as an infrared LED. Due to this control signal transmission, the image data is transmitted from the hand scanner to the main device with higher reliability.

Though not shown in the drawings, a rechargeable battery or a dry cell is incorporated in the hand scanner as a power source.

An operation of the first embodiment for reading the image of the original will be described below. The hand scanner 14 is first positioned on one edge of the original 16. It is to be noted that the position of the hand scanner 14 is so set that the transmission window 18 of the hand scanner 14 and the reception window 20 of the main device 12 face each other and the hand scanner 14 and the main device 12 are within the light transmitting-/receiving area enabling the optical communication between the main device 12 and the hand scanner 14. It is necessary to remove an obstacle between the main device 12 and the hand scanner 14.

The operator manually scans the original 16 by slowly moving the hand scanner 18 in the subscanning direction (orthogonal to the direction of the line sensor) while keeping the positional relationship between the transmission window 18 and the reception window 20 in order to face each other. The amount of movement is detected by the rotary encoder and the output of the line sensor is sampled when the hand scanner 14 is moved by a predetermined distance. Thus, the image of the original is read for every scanning line of a predetermined pitch. The image data is modulated by the modem 54 and sent from the LED 30 as an optical signal. This optical signal is detected by the photodiode 60 of the main device and is demodulated by the modem 62. As described above, the image data read by the line sensor 26 is transmitted to the image processor 64 by means of optical transmission.

According to the first embodiment, by converting the image data obtained by the hand scanner to an optical signal and by transmitting the optical signal to the main device, it is possible to highly increase the freedom of the scanning and the operability of the hand scanner with regard to the conventional device in which the hand scanner is connected to the main device by the cord even though the positional relationship between the hand scanner and the main device must be kept constant.

Though the description is made with respect to the bidirectional optical transmission, it is possible to only transmit the signal from the hand scanner to the main device. In the latter, the receiving part of the hand scanner and the transmitting part of the main device can be omitted thereby simplifying the arrangement of the apparatus.

Figure 6:
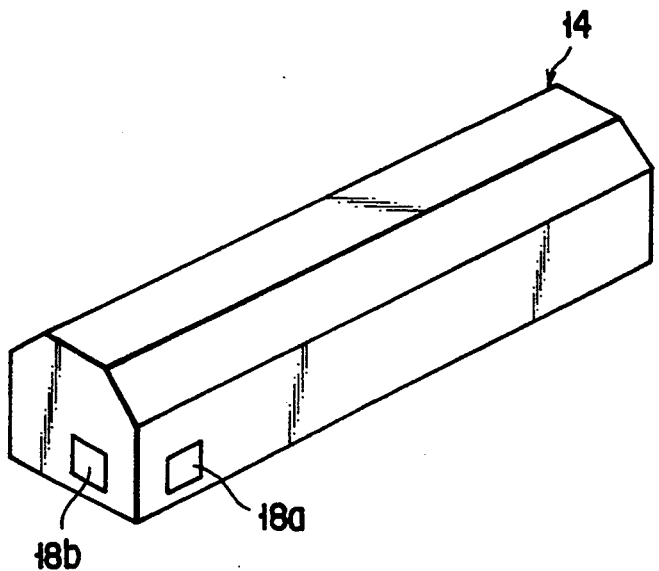
FIG. 6 shows a modification of the scanner of the first embodiment.

FIG. 6 shows a modification of the hand scanner 14a of the first embodiment. The hand scanner 14a includes a transmission window 18a in one surface of a housing which is the same surface on which the transmission window 18 is provided and a transmission window 18b in another surface of the housing which is orthogonal to the surface on which the transmission window 18a is provided. Light emitting elements as shown in FIG. 3 are provided inside these transmission windows 18a and 18b. These light emitting elements transmit the same optical signal.

According to this modification, it is possible to face the transmission window of the hand scanner and the reception window of the main device even if the hand scanner is parallel and perpendicular to the main device. Therefore, the scanning operability is further increased.

Another modification of the hand scanner having more than three transmission windows can be used.

Instead of optical transmission of the image data, it is possible to transmit the image data by means of an electromagnetic wave which is on/off modulated in accordance with the image data. For this purpose, the LEDs 30 and 68 are replaced by transmitters and the photodiodes 60 and 56 are replaced by receivers.

Other embodiments will be described below. In the following descriptions, those portions of these embodiments that are the same as those in the first embodiment are designated by the same reference numerals and the detailed description thereof will be omitted.

In the first embodiment using light for transmitting the image data, the amount of light received by the main device or the light incident angle varies due to the influences of fluorescent light or external disturbing light while the hand scanner is moved on an original to read image data. Therefore, errors may be included in the image data transmitted from the hand scanner to the main device, and the quality of the image is degraded. If the hand scanner and the main device are connected to each other through a radio transmission path using an electromagnetic wave, data errors are caused by other electromagnetic waves existing on the transmission path. As a result, the image quality deteriorates in the same manner as described above. The following embodiments aim to prevent the deterioration of the image quality which is caused by a transmission error.

Figure 8:
FIG. 8 shows a data format transmitted to a main device from the scanner of the second embodiment.

FIG. 7 is a block diagram showing an image reading apparatus according to a second embodiment of the present invention. The image data output from the line sensor (not shown in FIG. 7) is input to an address data generator 70 in the hand scanner 14. The address data generator 70 adds an address to the image data for specifying the image data. The image data is processed by a unit of a predetermined amount of data, e.g., 256 bytes. The address signal and the image data are input to a framing circuit 72 and a data frame is produced as shown in FIG. 8. The data frame is formed of a start flag (FLG) for denoting the head of the frame, an address for specifying the image data of the frame (ADD), the image data (DAT), and an end flag (FLG) for denoting the end of the frame. The address signal and the image data are also supplied to a memory 78.

The output from the framing circuit 72 is supplied to an LED (infrared rays) 76 through a modulator 74. Thus, the LED 76 transmits the image data to the main device 12 by an optical signal in the form of the frame data as shown in FIG. 8.

The main device 12 includes a photodiode 88 for receiving the infrared rays from the LED 76. The output signal of the photodiode 88 is supplied to a deframing circuit 92 through a demodulator 90. The output signal of the demodulator 90 is also supplied to an LED (infrared rays) 96 through a modulator 94. The deframing circuit 92 restores the input framed image data into an original raw image data. The raw image data is supplied to the image processor 64 (not shown in FIG. 7). The main device 12 returns the framed image data transmitted from the hand scanner 14 to the hand scanner 14 by using the LED 96.

The returned image data is received by a photodiode 80 of the main hand scanner 14. The output signal of the photodiode 80 is supplied to a deframing circuit 84 through a demodulator 82. The output raw image data from the deframing circuit 84 is compared with the image data stored in the memory 78 by a comparator 86. The memory 78 stores the raw image data transmitted to the main device 12 from the hand scanner 14 before framing. The comparator 86 compares these two image data (transmitted data and returned data) having the same address to each other.

An operation of the second embodiment will be described next. When the hand scanner 14 is moved on an original (not shown), an image data of the original (a graphic pattern or the like) is read by the line sensor. The image data is framed as shown in FIG. 8 and is transmitted to the main device 12 through the modulator 74 and the LED 76. The image data with the address being added is stored in the memory 78.

In the main device 12, the frame data is received by the photodiode 88. The received data is supplied to the deframing circuit 92 through the demodulator 90 and is restored to the original raw image data. The original image data is supplied to the image processor. The main device 12 returns the transmitted image frame data to the hand scanner 14 as it is by using the LED 96. The returned frame data is received by the photodiode 80 of the main device 14. The output of the photodiode 80 is supplied to the deframing circuit 84 through the demodulator 82 and is restored to the original raw image data. The comparator 86 reads out the image data having the same address as the returned image data and compares these image data to each other. If the coincidence is detected, it can be determined that the image data is correctly transmitted to the main device 12 from the hand scanner 14. If the coincidence is not detected, it can be determined that the image data transmitted from the hand scanner 14 to the main device 12 includes an error. Therefore, if the coincidence is detected, the image data of that address is erased from the memory 78. If the coincidence is not detected, the image data is not erased from the memory 78 and this address data is also stored. This comparison is performed for every frame of data. When all the image data are transmitted from the hand scanner 14 to the main device 12, the hand scanner 14 retransmits to the main device 12 the image data stored in the memory 78 with the address being attached and in the form of the frame. At this time, the comparator 86 compares the image data as described above to detect the transmission error. The above operation will continue until the image data does not remain in the memory 78.

According to the second embodiment, the image data transmitted from the hand scanner 14 to the main device 12 is returned from the main device 12 to the hand scanner 14 to be compared with the transmitted image data. If the transmitted image data and the returned image data do not coincide with each other, it can be determined that transmitting error has occurred. The hand scanner 14 retransmits the image data regarding the transmission error. Consequently, the main device 12 can receive the image data having no error. Therefore, even with a cordless hand scanner, a deterioration in image quality can be prevented.

FIG. 9 is a block diagram showing a third embodiment of the present invention. The third embodiment is different from the second embodiment shown in FIG. 7 in that the framed image data is transmitted/received between the hand scanner 14 and the main device 12 by using an electromagnetic wave. The LEDs 76 and 96 are replaced by electromagnetic wave transmitters 100 and 106 and the photodiodes 80 and 88 are replaced by electromagnetic wave receivers 102 and 104. The transmitter 100 of the hand scanner 14 transmits to the main device 12 the electromagnetic wave which is on/off modulated in accordance with the modulated image data frame from the modulator 74. The receiver 104 of the main device 12 receives the modulated image data frame wave transmitted from the hand scanner 14 and the demodulator 90 demodulates the received data. The returned image data is also transmitted in the form of the modulated electromagnetic wave, received by the receiver 102 of the hand scanner 14, and demodulated by the demodulator 82. The other arrangements and operations of the third embodiment are the same as those in the second embodiment, and the third embodiment has the same effects as the second embodiment.

Figure 11:
FIG. 11 shows a data format transmitted to a main device from the scanner of the second embodiment.
Figure 12:
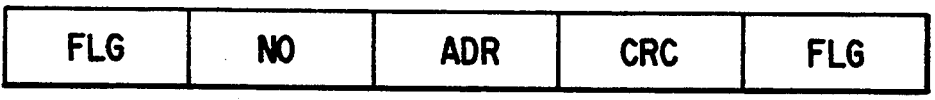
FIG. 12 shows a data format of a retransmission request signal which is transmitted from the main device to the scanner.
Figure 10:
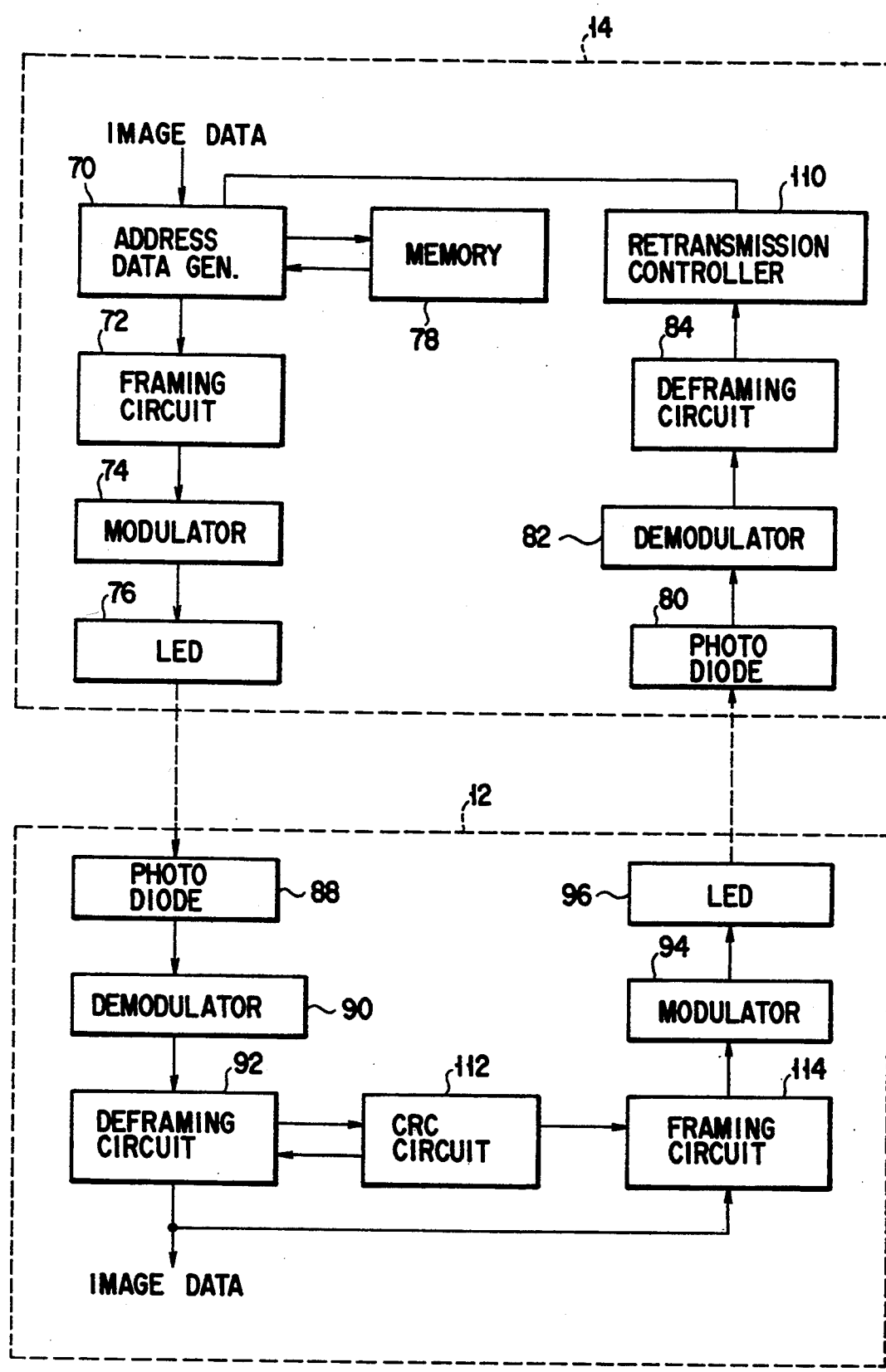
FIG. 10 is a block diagram illustrating a fourth embodiment of the image reading apparatus according to the present invention.

FIG. 10 is a block diagram showing a fourth embodiment of the present invention. In the second and third embodiments, all the transmitted image data is returned to the hand scanner and the hand scanner checks whether or not a transmission error has occurred. In contrast to these embodiments, in the fourth embodiment, the main device checks whether or not a transmission error has occurred and only a retransmission request signal is returned to the hand scanner. By reasons of this check, the framing circuit 72 of the hand scanner 14, unlike the second and third embodiments, produces a frame data based on a HDLC (High Level Data Linc Control Procedure), as shown in FIG. 11. This frame data is different from that of FIG. 8 in that a CRC (Cyclic Redundancy Check) flag is added between the data flag and the end flag. In the hand scanner 14, there is provided a retransmission controller 110 for storing an address output from the deframing circuit 84 and for supplying a retransmission control signal to the address data generator 70. In the main device 12, the output from the deframing circuit 92 is supplied to a CRC circuit 112 and a framing circuit 114. The framing circuit 114 supplies the frame data as shown in FIG. 12 to the modulator 94. Other arrangements of the fourth embodiment are the same as those of the previous embodiments.

An operation of the fourth embodiment will be described next. When the hand scanner 14 is moved on an original (not shown), an image data of the original is read by the line sensor. The image data is framed as shown in FIG. 11 and is transmitted to the main device 12 through the modulator 74 and the LED 76. The image data with the address being added is stored in the memory 78.

In the main device 12, the frame data is received by the photodiode 88. The received data is supplied to the deframing circuit 92 through the demodulator 90 and is restored to the original raw image data. The CRC flag obtained upon the deframing is supplied to the CRC circuit 112. The CRC circuit 112 performs a cyclic redundancy check based on the CRC flag to detect the transmission error. When no transmission error is detected, the original image data DAT is supplied to the image processor (not shown). When the CRC circuit 112 detects the transmission error, the transfer of the image data from the deframing circuit 92 to the image processor is not performed but the address of the frame including the transmission error is transferred to the framing circuit 114 from the deframing circuit 92. The framing circuit 114 produces a frame of data as shown in FIG. 12 including a serial number (NO), address (ADR) of the image data including the transmission error, and the CRC flag. The framed data is returned to the hand scanner 14 through the modulator 94 and the LED 96. The serial number is successively attached to the returned frame. The framing circuit 114 of the main device 12 stored the relationship between the serial number and the address of the image data.

The returned frame data is received by the receiver 122 of the main device 14. The output of the receiver 22 is supplied to the deframing circuit 84 through the demodulator 82 and is restored to the original raw image data. The original image data is supplied to the retransmission controller 110. The retransmission controller 110 also performs a cyclic redundancy check based on the CRC flag of the returned data and stores the address of the frame having no transmission error. If an object, such as a hand of the operator, interrupts the light transmission path between the hand scanner and the main device during the transmission of the returned data, the serial number is not continuous. Therefore, the retransmission controller 110 checks the continuity of the serial number of the received frame and stores the serial number of the interrupted frame if the discontinuity of the serial number is detected. The retransmission controller 110 also stores the serial number of the frame if the transmission error is detected by the CRC check. It is to be noted that if the transmission error is detected the address is neither correct. However, it is possible to obtain a correct address of the frame with the transmission error by using the addresses of a frame received before that frame and a frame received after that frame.

When all the image data are transmitted from the hand scanner 14 to the main device 12, the retransmission controller 110 supplies to the address data generator 70 the stored address of the frame of which a transmission error during the data transmission from the hand scanner 14 to the main device 12 is detected by the CRC circuit 112 of the main device 12. The address data generator 70 reads out the image data which is specified by this address data from the memory 78. The framing circuit 72 retransmits to the main device 12 this image data in the form of the frame as shown in FIG. 11. During this retransmission, the retransmission request signal is also returned to the hand scanner 14 from the main device 12 if the transmission error is detected.

Figure 13:
FIG. 13 shows a data format of a retransmission signal which is transmitted from the scanner to the main device when it is detected that the retransmission signal is interrupted.

When the image data specified by all the addresses stored in the retransmission controller 110 is retransmitted, the framing circuit 72 produces a data frame formed of the serial number and the CRC flag as shown in FIG. 13. The serial number represents the frame which is not properly returned to the hand scanner such as an interrupted frame or a frame with a transmission error. The frame data is transmitted to the main device 12. The deframing circuit 92 of the main device 12 supplies the serial number to the framing circuit 114. The framing circuit 114 outputs the address corresponding to the serial number and produces the retransmission request signal as shown in FIG. 12.

According to the fourth embodiment, since the HDLC data frame is transmitted from the hand scanner 14 to the main device 12, a transmission error of the received data can be detected by the main device 12, and only an address specifying the image data in which the error is caused is returned to the hand scanner 14 to cause it to retransmit the corresponding image data. With this arrangement, unlike in the second and third embodiments, all the image data received by the main device 12 need not be returned to the hand scanner 14, thus reducing the amount of data returned from the main device 12 to the hand scanner 14. Therefore, the amount of power consumed by the hand scanner 14 and the main device 12 can be reduced as compared with the second and third embodiments. Because of this, the time during which the hand scanner 14 is driven by a battery can be prolonged. Similar to the second and third embodiments, in the fourth embodiment, since the data having a transmission error is retransmitted, no errors are included in the image data finally received by the main device 12, and hence high-quality image data can be obtained.

Figure 14:
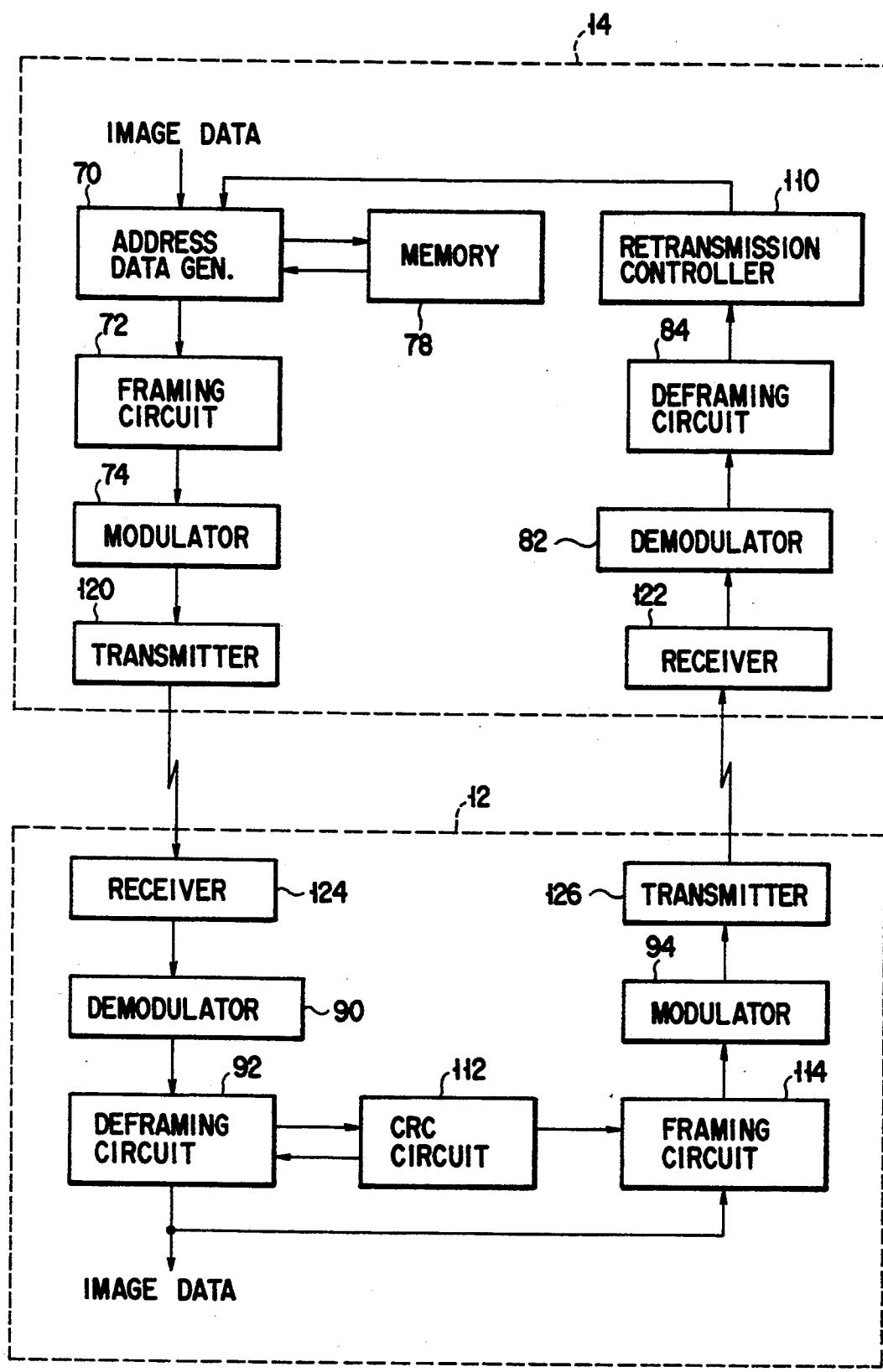
FIG. 14 is a block diagram illustrating a fifth embodiment of the image reading apparatus according to the present invention.

FIG. 14 is a block diagram showing a fifth embodiment of the present invention. The fifth embodiment is different from the fourth embodiment shown in FIG. 10 in that image data are transmitted/received between the hand scanner 14 and the main device 12 by using an electromagnetic wave. The LEDs 76 and 96 shown in FIG. 10 are replaced by transmitters 120 and 126 and the photodiodes 80 and 88 of FIG. 10 are replaced by receivers 122 and 124. The transmitter 120 of the hand scanner 14 transmits to the main device 12 the electromagnetic wave which is on/off modulated in accordance with the modulated image data in the form of the HDLC frame from the modulator 74. The receiver 124 of the main device 12 receives the modulated image data frame wave transmitted from the hand scanner 14 and the demodulator 90 demodulates the received data. The returned image data is also transmitted in the form of the modulated electromagnetic wave by the transmitter 126, received by the receiver 122 of the hand scanner 14, and demodulated by the demodulator 82. The other arrangements and operations of the fifth embodiment are the same as those in the fourth embodiment, and the fifth embodiment has the same effects as the fourth embodiment.

FIG. 15 is a block diagram showing a sixth embodiment of the present invention. In the second and third embodiments, the received data is returned to the hand scanner from the main device and the image data is retransmitted to the main device if the transmission error is detected by the main device. In the fourth and fifth embodiments, when the main device detects the transmission error, the retransmission request signal is transmitted to the hand scanner and the image data is retransmitted to the main device. Unlike these embodiments, the sixth embodiment does not necessitate retransmission of the image data by correcting the transmission error in the receiver part (main device). The hand scanner 14 includes an error correction coding circuit 140 of a convolution coding type. The output of the coding circuit 140 is transmitted to the main device 12 through a modulator 142 and an LED 144.

The transmitted image data is received by a modulator 146 and is demodulated by a demodulator 148. The demodulated data is supplied to an error correcting decoding circuit 150 which performs a maximum likelihood decoding according to viterbi algorithm. The output from the decoding circuit 150 is supplied to an image processor.

According to the sixth embodiment, since the image data is subjected to error correction coding before transmitting to the main device 12 from the hand scanner 14, the main device 12 can correct most transmission errors while decoding the data. Therefore, the degradation of the image quality can be suppressed within such an extent that no practical problems are posed. In addition, unlike in the second to fifth embodiments, the sixth embodiment does not require return of the image data or the retransmission request signal and retransmission of the image data from the hand scanner to the main device. Therefore, the number of components of the apparatus can be reduced to realize a reduction in cost, and the power consumption of the hand scanner 14 can be greatly reduced.

FIG. 16 is a block diagram showing a seventh embodiment of the present invention. The seventh embodiment is different from the sixth embodiment shown in FIG. 15 in that image data are transmitted/received between the hand scanner 14 and the main device 12 by using an electromagnetic wave. The LED 144 shown in FIG. 15 is replaced by a transmitter 152 and the photodiode 146 shown in FIG. 15 is replaced by a receiver 154. The transmitter 152 of the hand scanner 14 transmits to the main device 12 the electromagnetic wave which is on/off modulated in accordance with the modulated image data from the modulator 142. The receiver 154 of the main deice 12 receives the modulated wave transmitted from the hand scanner 14 and the demodulator 148 demodulates the received data. The other arrangements and operations of the seventh embodiment are the same as those in the sixth embodiment, and the seventh embodiment has the same effects as the sixth embodiment.

The second to seventh embodiments relate to a system for detecting the transmission error and for retransmitting the image data or correcting the error and thus for reducing the resultant effect of the transmission error. A description will now be made relating to embodiments for preventing the transmission error.

A remote control unit used for an electrical device is generally formed as a cordless type having no cord for connecting the remote control unit to the electrical device in order to achieve an improvement in operability of the remote control unit, and is designed to transmit control data by optical communication through space. The basic principle of optical communication is that the control data to be transmitted is expressed by the intensity of light. Methods of modulating light as a carrier wave include an FM modulation scheme, a baseband scheme, and the like. At the transmitting end, emission/non-emission of a current/light conversion element such as an LED is controlled in accordance with volume control data modulated by, e.g., the FM modulation scheme, to generate an FM-modulated optical signal, and the optical signal is emitted into space. At the receiving end, the optical signal emitted from the transmitting end and arriving through space is received by a light/current conversion element such as a photodiode to restore it to an electrical signal.

When such optical communication is to be realized by using space as a transmission path, natural light such as sunlight or light from an indoor lighting apparatus is also converted into an electrical signal by the light/current conversion element at the receiving end, and the electrical signal is superposed, as a noise component, on an optical signal. Because of this natural light, unless some countermeasures are taken against non-polarized light such as natural light, i.e., external disturbing light having light components in various signal directions, extraction of optical signals may be greatly influenced by such light. In the worst case, accurate data transmission cannot be performed. In consideration of these circumstances, in optical communication through space, various measures have been taken to eliminate the influences of external disturbing light. The use of infrared rays as light for transmission as described above is one of the measures. Since natural light includes a relatively small number of infrared rays, the influences of natural light on signals can be reduced accordingly.

Another measure uses an optical filter for selectively transmitting an optical signal and attenuating light components having wavelengths other than the wavelength of the optical signal. With this filter, the amount of external disturbing light incident on a light/current conversion element can be decreased to reduce its influences on signals.

Still another measure uses a method of setting a modulation frequency to minimize the influences of external disturbing light. With regard to external disturbing light emitted from an indoor lighting unit or the like, frequency components contained in the light are known from the switching frequency and the like of the indoor lighting unit. In this method, therefore, a modulation frequency different from such a frequency is set. With this setting, the influences of external disturbing light can be reduced by performing electrical processing of an electrical signal obtained by a light/current conversion element, e.g., causing it to pass through a band-pass filter.

According to the present invention, the following measures are taken.

Figure 17:
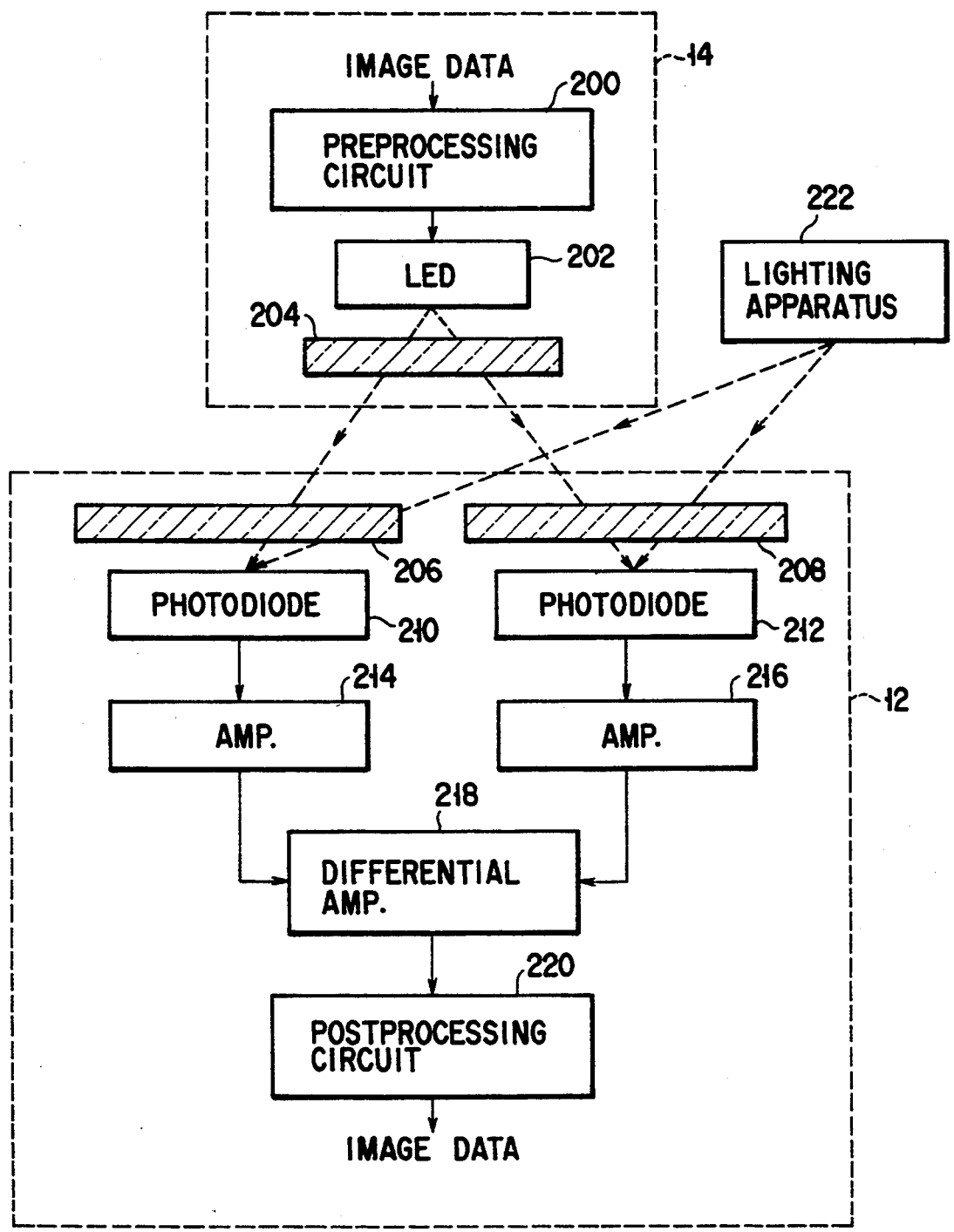
FIG. 17 is a block diagram illustrating an eighth embodiment of the image reading apparatus according to the present invention.

FIG. 17 shows an eighth embodiment of the present invention. The hand scanner 14 includes a preprocessing circuit 200, a photodiode 202 as a current/light conversion element, and a polarizer 204. The LED 202 may emit the infrared rays as in the above embodiments or the natural light rays. The light emitted from the LED 202 is transmitted to the main body 12 through the polarizer 204. The preprocessing circuit 200 performs preprocessing such as framing (frame formatting), signal level conversion, and FM modulation of image data (representing digital data) supplied from the line sensor. The LED 202 is turned on/off in accordance with the electrical signal output from the preprocessing circuit 200. With this operation, an optical signal including ON/OFF data is generated. The optical signal is emitted to the space between the hand scanner 14 and the main device 12 through the polarizer 204. The polarizer 204 optically extracts only a light component having a specific polarizing angle from the light (non-polarized light exhibiting no polarization characteristics as a whole, since the respective light components oscillate in various directions) emitted from the LED 202 so as to generate linearly polarized light.

The main device 12 includes a first optical system 206, a photodiode 210 as a first light/current conversion element, a first amplifier 214, a differential amplifier 218, a second optical system 208, a photodiode 212 as a second light/current conversion element, a second amplifier 216, and a post-processing circuit 220.

The first optical system 206 serves to focus incident light onto the photodiode 210 upon performing optical processing such as extraction of a light component of a specific wavelength. It is noted that the first optical system 206 is not dependent on the polarization characteristics of incident light. The first photodiode 210 generates a current of a level corresponding to the amount of light transmitted through the first optical system 206. The electrical signal output from the photodiode 210 is amplified by the first amplifier 214 at a predetermined amplification factor. The amplified signal is then supplied to the differential amplifier 218.

The second optical system 208 focuses incident light onto the photodiode 212 upon performing optical processing such as extraction of a light component of a specific wavelength. It is noted that the second optical system 208 includes an analyzer which selectively allows a light component having a specific polarizing angle to be transmitted therethrough. That is, the amount of light transmitted through the second optical system 208 is dependent on the polarization characteristics of incident light. The second photodiode 212 generates a current of a level corresponding to the amount of light transmitted through the second optical system 208. The electrical signal output from the second photodiode 212 is amplified by the second amplifier 216 at a predetermined amplification factor. The amplified signal is then supplied to the differential amplifier 218. It is noted that the amplification factors of the first and second amplifiers 214 and 216 are set to compensate for the difference in the amount of attenuation between light transmitted through the first optical system 206 and light transmitted through second optical system 208 when a non-polarized light is incident on the first and second optical systems 206 and 208. More specifically, since the amount of attenuation of light transmitted through the second optical system 208 is larger than that of the light transmitted through the first optical system 206 because of attenuation by the analyzer, the amplification factor of the second amplifier 216 is set to be larger than that of the first amplifier 214. For example, the amplification factor is determined by actually measuring the difference in attenuation characteristics between the first optical system 206 and the second optical system 208 while the optical signal is not transmitted from the hand scanner 14 but the non-polarized light is incident on the first and second optical systems 206 and 208.

The differential amplifier 218 generates an electrical signal of a level corresponding to the level difference between the electrical output signals of the first and second amplifiers 214 and 216, and supplies it to the post-processing circuit 220. The post-processing circuit 220 performs post-processing such as deframing (unformatting/restoration of a frame structure) and signal level conversion of the electrical signal of the output signal of the differential amplifier 218 so as to reproduce the image data.

In addition to the light emitted from the hand scanner 14, external disturbing light such as light emitted from the indoor lighting apparatus 222 is incident on the main device 12.

Figure 18:
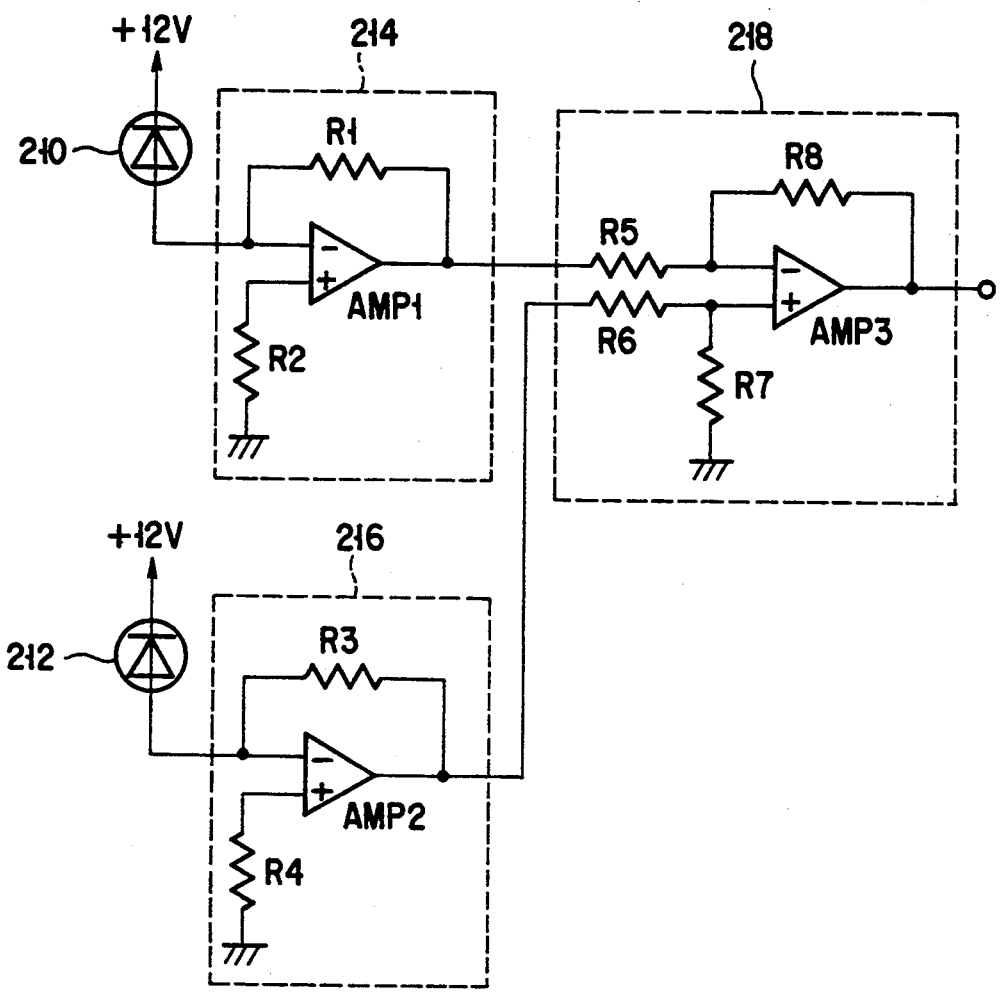
FIG. 18 is a detailed circuit diagram showing photodiodes, amplifiers, and a differential amplifier of the eighth embodiment of FIG. 17.

FIG. 18 is a circuit diagram showing the detailed arrangement of the first photodiode 210, the first amplifier 214, the differential amplifier 218, the second photodiode 212, and the second amplifier 216, which is included in the main device 12 shown in FIG. 17.

As shown in FIG. 18, the first amplifier 214 is formed of a differential amplifier AMP1 and resistors R1 and R2. The second amplifier 216 is formed of a differential amplifier AMP2 and resistors R3 and R4. The differential amplifier 218 is formed of a differential amplifier AMP3 and resistors R5, R6, R7, and R8.

A reverse bias is applied to the first photodiode 210 to operate it at high speed. Upon radiation of light, the photodiode 210 generates a current. An inverting input terminal of+the differential amplifier AMP1 is connected to an anode of the photodiode 210 so that the current generated by the photodiode 210 is supplied to the inverting input terminal of the differential amplifier AMP1. A non-inverting input terminal of the differential amplifier AMP1 is grounded through the resistor R2. An output from the differential amplifier AMP1 is fed back to the inverting input terminal through the resistor R1. Therefore, the differential amplifier AMP1 outputs a voltage of a level corresponding to the level of the current generated by the photodiode 210.

A reverse bias is applied to the photodiode 212 to operate it at high speed. Upon radiation of light, the photodiode 212 generates a current. An inverting input terminal of the differential amplifier AMP2 is connected to an anode of the photodiode 212 so that the current generated by the photodiode 212 is supplied to the inverting input terminal of the differential amplifier AMP2. A non-inverting input terminal of the differential amplifier AMP2 is grounded through the resistor R4. An output from the differential amplifier AMP2 is fed back to the inverting input terminal through the resistor R3. Therefore, the differential amplifier AMP2 output a voltage of a level corresponding to the level of the current generated by the photodiode 212.

The output from the differential amplifier AMP1 is supplied to an inverting input terminal of the differential amplifier AMP3 through the resistor R5. The output from the differential amplifier AMP2 is supplied to a non-inverting input terminal of the differential amplifier AMP3 through the resistor R6. The non-inverting input terminal of the differential amplifier AMP3 is grounded through the resistor R7. An output from the differential amplifier AMP3 is fed back to the inverting input terminal through the resistor R8. Therefore, the differential amplifier AMP3 differentially amplifies the outputs from the differential amplifiers AMP1 and AMP2.

Figure 19:
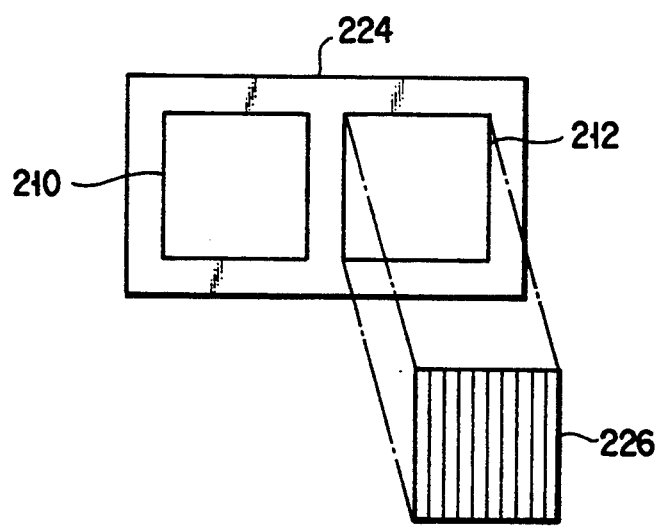
FIG. 19 shows an arrangement of the photodiodes of the eighth embodiment.

It is noted that the first and second photodiodes 210 and 212 are formed adjacent to each other on a base 224 to be integrated into a single chip, as shown in FIG. 19. For example, a film-like polarizing material 226 is bonded to the photodiode 212 so that only the photodiode 212 has polarization dependency. Although not shown, the first and second optical systems 206 and 208 are also arranged adjacent to each other in correspondence with the first and second photodiodes 210 and 212.

FIGS. 20A to 20D schematically shows the relationships between light incident on the optical systems, the polarization characteristics of the optical systems, and light transmitted through the optical systems. Referring to FIGS. 20A to 20D, the arrows in the circles indicate polarizing directions, and the circles including both the vertical and horizontal arrows represent the state of non-polarized light exhibiting no polarization characteristics.

FIGS. 20A and 20B show the transmitted states of light in an optical system having no polarization dependency, i.e., the first optical system 206. FIG. 20A indicates that when a case wherein light having random polarization characteristics is incident, the transmitted light becomes non-polarized light. FIG. 20B indicates that when linearly polarized light is incident, the transmitted light is mainly constituted by linearly polarized light having the same polarizing angle as that of the incident light.

FIGS. 20C and 20D show the transmitted states of light in an optical system having polarization dependency, i.e., the second optical system 208. FIG. 20C indicates that when non-polarized light is incident, the transmitted light is mainly constituted by linearly polarized light having a polarizing angle corresponding to the maximum transmittance of the optical system. FIG. 20D indicates that when linearly polarized light having a polarizing angle corresponding to the maximum transmittance of the optical system is incident, the transmitted light becomes linearly polarized light having the same polarizing angle as that of the incident light. It is noted that if the analyzer in the second optical system 208 has ideal characteristics, a light component having a polarizing angle corresponding to the maximum transmittance of the analyzer is transmitted without attenuation, whereas all light components having polarizing angles which are different from the polarizing angle corresponding to the maximum transmittance of the analyzer by 90 degrees are absorbed and hence are not transmitted.

An operation of the eighth embodiment having the above-described arrangement will be described next. In the hand scanner 14, the image data is subjected to preprocessing in the preprocessing circuit 200 to be formed into a signal suited for optical transmission. The LED 202 is driven by the output signal from the preprocessing circuit 200. With this operation, the optical signal corresponding to the electrical signal from the preprocessing circuit 200 is emitted from the LED 202. The optical signal is converted into the linearly polarized optical signal by the polarizer 204 and is emitted to the space between the hand scanner 14 and the main device 12.

In the main device 12, the transmitted light is received by both the first and second photodiodes 210 and 212. The electrical signals obtained by the first and second photodiodes 210 and 212 are respectively amplified by the first and second amplifiers 214 and 216 at different predetermined amplification factors. Thereafter, the amplified signals are differentially amplified by the differential amplifier 218 to remove signal components corresponding to external disturbing light, thus extracting only a signal component corresponding to the optical signal and removing the external disturbing light. The output signal of the differential amplifier 218 extracted as a signal component is subjected to post-processing in the post-processing circuit 220 to reproduce the electrical signal identical to the image signal supplied to the preprocessing circuit 200.

It will be described in detail below how signal components corresponding to external disturbing light are removed, and only a signal component corresponding to an optical signal is extracted.

Light arriving at the main device 12 includes not only the optical signal emitted from the hand scanner 14 but also the external disturbing light such as light emitted from the lighting apparatus 222 and natural light such as sunlight. It is noted that since the first and second optical systems 210 and 208 are arranged adjacent to each other, it can be considered that the optical signal and the external disturbing light incident on the first optical system 210 are identical to the optical signal and the external disturbing light incident on the second optical system 208.

The influences of the external disturbing light will be considered. The external disturbing light oscillates in various directions and hence is considered as non-polarized light exhibiting no polarization characteristic as a whole. Therefore, transmitted light exhibiting no polarization characteristic is obtained by the first optical system 210, as shown in FIG. 20A. This transmitted light is received by the photodiode 210, and the electrical signal corresponding to the amount of the transmitted light is generated. That is, the electrical signal output from the photodiode 210 has a value corresponding to the amount of light actually arriving at the main device 12.

In contrast to the first optical system 206, when the external disturbing light having no polarization characteristic is incident on the second optical system 208, transmitted light as linearly polarized light having a polarizing angle corresponding to the maximum transmittance of the second optical system 208 is mainly obtained, as shown in FIG. 20C. That is, light components having polarizing angles which are different from the polarizing angle corresponding to the maximum transmittance are attenuated. In this case, the amount of the attenuation of light in the second optical system 208 varies in accordance with the difference between the polarizing angle of a light component and the polarizing angle corresponding to the maximum transmittance of the second optical system 208. However, since external disturbing light has the random polarization characteristics, as described above, an overall amount of attenuation can be considered constant. Therefore, the amount of external disturbing light transmitted through the second optical system 208 is always smaller than that through the first optical system 210, with a predetermined ratio. The transmitted light having such characteristics is received by the photodiode 212, and the electrical signal corresponding to the amount of transmitted light is generated.

That is, the level of the electrical signal output from the second photodiode 212 is always lower than that of the electrical signal output from the first photodiode 210, with a predetermined ratio. These electrical signals obtained by the first and second photodiodes 210 and 212 are respectively amplified by the first and second amplifiers 214 and 216. The amplified signals are then supplied to the differential amplifier 218.

As described above, the amplification factor of the second amplifier 216 is set to be larger than that of the first amplifier 214 in order to compensate for the difference (constant, as described above) between the amount of attenuation of light transmitted through the first optical system 206 and that of light transmitted through the second optical system 208. Consequently, the two electrical signals supplied to the differential amplifier 218 have almost the same level. Therefore, when the two electrical signals are differentially amplified by the differential amplifier 218, the two signals cancel each other, and the level of the electrical signal output from the differential amplifier 218 becomes zero.

That is, the electrical signal output from the differential amplifier 218 is a signal from which signal components corresponding to the external disturbing light have been removed.

Extraction of a signal component corresponding to the optical signal emitted from the hand scanner 14 will be described next. When the optical signal is emitted from the hand scanner 14 under the condition that the external disturbing light is present, the optical signal from the hand scanner 14 is also incident on the first and second optical systems 206 and 208. Although the optical signal emitted from the LED 202 is linearly polarized by the polarizer 204, since the first optical system 206 has no polarization dependency, the optical signal is transmitted through the first optical system 206, as shown in FIG. 20B. Therefore, the amount of light incident on the first photodiode 210 is equal to the sum of the amount of external disturbing light which is not decreased as shown in FIG. 20A and the amount of light of the optical signal from the hand scanner 14.

If the polarizing angle corresponding to the maximum transmittance of the second optical system 208 and the polarizing angle of the optical signal passed through the polarizer 204 are set to coincide with each other, the optical signal from the hand scanner 14 is transmitted through the second optical system 208 while it is scarcely attenuated as shown in FIG. 20D. Therefore, the amount of light incident on the second photodiode 212 is equal to the sum of the amount of external disturbing light which is decreased as shown in FIG. 20B and the amount of light of the optical signal from the hand scanner 14.

As described above, the electrical signals respectively output from the first and second photodiodes 210 and 212 have the same level in the optical signal component emitted from the hand scanner 14 but the different level in the external disturbing light component. Since the amplification factor of the second amplifier 216 is larger than that of the first amplifier 214, a component corresponding to the optical signal contained in the output signal of the second photodiode 212 is amplified at a larger amplification factor than a component corresponding to the optical signal contained in the output signal of the first photodiode 210. On the other hand, a component corresponding to the external disturbing light contained in the output signal of the second photodiode 212 is equal to that contained in the output signal of the first photodiode 210. Therefore, upon differential amplification, the difference between the components corresponding to the optical signal contained in the output signal of the second photodiode 212 and the first photodiode 210.

As described above, according to the eighth embodiment, in the main device 12, since the external disturbing light is removed by cancellation using the first optical system 206 having a polarization characteristic and the second optical system 208 having a nonpolarization characteristic, signal components corresponding to the external disturbing light can always be removed regardless of the state of external disturbing light. This allows extraction of a signal component corresponding to the optical signal emitted from the hand scanner 14 without being influenced by the external disturbing light. Therefore, data transmission can be performed without being influenced by environmental conditions, and the data transmission system can be used under various conditions.

It is assumed that the optical signal emitted from the hand scanner 14 is linearly polarized. In this case, even if the optical signal has a typical wavelength or a modulation frequency of the external disturbing light, signal separation can be performed, thus allowing relatively free selection of signal forms. Due to this fact, when a plurality of channels are to be set, wavelengths and modulation frequencies can be used only for channel division. Therefore, channel setting and the like can be freely performed.

In addition, since the optical data transmission system is free from the influences of the external disturbing light, the data transmission distance can be increased as compared with the conventional system, provided that the amount of light emitted from the hand scanner 14 is constant.

FIG. 21 is a block diagram showing the arrangement of an ninth embodiment according to the present invention. The arrangement of the hand scanner 14 is the same as that of the eighth embodiment shown in FIG. 17. The main device 12 includes a first optical system 230, the first photodiode 210, the first amplifier 42, the differential amplifier 218, the second optical system 208, the second photodiode 212, the second amplifier 216, and the post-processing circuit 220. The main device 12 basically has the same arrangement as that of the eighth embodiment. However, the first optical system 230 has polarization dependency, unlike the first optical system 206 in the eighth embodiment. A polarizing angle corresponding to the maximum transmittance of the first optical system 230 is different from that of the second optical system 208 by 90 degrees. The first optical system 230 has the same optical characteristics as those of the second optical system 208 except for an angle difference of 90 degrees between the polarizing angles corresponding to the maximum transmittances. More specifically, identical analyzers are respectively arranged in the first and second optical systems 230 and 208 in directions which differ from each other by 90 degrees. The first and second amplifiers 214 and 216 amplify electrical signals 10 output from the photodiodes 210 and 212, at the same amplification factor.

An operation of the ninth embodiment having the above-described arrangement will be described next. Only the influences of the external disturbing light will be considered first. Since the first and second optical systems 230 and 208 have the same optical characteristics except that the polarizing angles corresponding to the maximum transmittances of the two systems are different from each other, and the external disturbing light has random polarization characteristics, attenuation amounts of light transmitted through the two optical systems 230 and 208 are the same as a whole. In addition, since the first and second optical systems 230 and 208 are arranged adjacent to each other, the external disturbing light incident on the two optical systems 230 and 208 can be considered the same. Therefore, the amount of light incident on the first photodiode 210 is equal to that incident on the second photodiode 212, and the output signals of the photodiodes 210 ad 212 become identical.

The output signals of the photodiodes 210 and 212 obtained in this manner are respectively amplified by the first and second amplifiers 214 and 216 at the same amplification factor and are supplied, as identical signals, to the differential amplifier 218. Therefore, when the output signals of the amplifiers 214 and 216 are amplified by the differential amplifier 218, the two signals cancel each other, and the level of an output from the differential amplifier 218 becomes zero, thus removing the external disturbing light.

When an optical signal is emitted from the hand scanner 14, this optical signal is also incident on the first and second optical systems 230 and 208. In this case, if the polarizing angle of the optical signal (of the polarizer 204) is set to coincide with the polarizing angle corresponding to the maximum transmittance of the second optical system 208, similar to the eighth embodiment, the optical signal is transmitted through the second optical system 208 while it is scarcely attenuated. Consequently, the level of the electrical signal generated by the second photodiode 212 becomes the sum of the level corresponding to the amount of the light of the optical signal and the level corresponding to the amount of the external disturbing light. In addition, most of the optical signal is absorbed by the first optical system 230 and hence is scarcely transmitted therethrough. This is because the polarizing angle corresponding to the maximum transmittance of the first optical system 230 differs from that of the second optical system 208 by 90 degrees, and also differs from the optical signal having the same polarizing angle as that corresponding to the maximum transmittance of the second optical system 208 by 90 degrees. Therefore, the output of the first photodiode 210 is the signal component corresponding only to the amount of the external disturbing light.

when differential amplification is performed by the differential amplifier 218, signal components, of the electrical signal of the output signal of the photodiodes 210 and 212, corresponding to the external disturbing light, are canceled and removed. As a result, only the signal component corresponding to the optical signal emitted from the hand scanner 14 is output from the differential amplifier 218.

As described above, in the ninth embodiment, the signal component corresponding to the optical signal emitted from the hand scanner 14 can be extracted without being influenced by the external disturbing light, and the same effects as those in the eighth embodiment can be obtained. According to the ninth embodiment, since the first and second optical systems 230 and 208 have the same structure and the same optical characteristics except for the polarizing angles corresponding to the maximum transmittances, the attenuation amount of light in the first optical system 230 is the same as that in the second optical system 208. Therefore, the amplification factors of the first and second amplifiers 214 and 216 can be set to be the same. That is, the respective amplification factors need not be set to be relatively different from each other, unlike in the eighth embodiment, thus facilitating the design of the system.

FIG. 22 is a block diagram showing the arrangement of a tenth embodiment according to the present invention. The hand scanner 14 includes a first preprocessor 200a, a first LED 202a, a first polarizer 204a, a second preprocessor 200b, a second LED 202b, and a second polarizer 204b.

The first preprocessor 200a performs preprocessing such as framing (frame formatting), signal level conversion, and FM modulation of the image data supplied from a line sensor. The first preprocessor 200a supplies the electrical signal to the first LED 202a. The first LED 202a is turned on/off in accordance with the output signal from the first preprocessor 200a. With this operation, an optical signal including ON/OFF data is generated by the LED 202a. The optical signal is emitted to the space between the hand scanner 14 and the main device 12 through the first polarizer 204a. The first polarizer 204a generates linearly polarized light by optically extracting only a light component having a specific polarizing angle from the light (non-polarized light showing no polarization characteristics as a whole, since the respective light components oscillate in various directions) emitted from the first LED 202a.

The second preprocessor 200b performs preprocessing such as framing (frame formatting), signal level conversion, and FM modulation of the image data. The second preprocessor 200b supplies the electrical signal to the second LED 202b. The second LED 202b is turned on/off in accordance with the output signal from the second preprocessor 200b. with this operation, an optical signal including ON/OFF data is generated by the LED 202b. The optical signal is emitted to the space between the hand scanner 14 and the main device 12 through the second polarizer 204b. The second polarizer 204b generates linearly polarized light by optically extracting only a light component having a specific polarizing angle from the light (non-polarized light showing no polarization characteristics as a whole, since the respective light components oscillate in various directions) emitted from the first LED 202b. It is noted that the polarizing angle of the light extracted by the second polarizer 204b is different from that extracted by the first polarizer 204a by 90 degrees. The arrangement of the main device 12 of this embodiment is the same as that of the ninth embodiment.

An operation of the tenth embodiment having the above-described arrangement will be described below. Since the external disturbing light removing operation in the main device 12 is the same as that in the ninth embodiment, a detailed description thereof will be omitted.

The tenth embodiment is characterized in that the first and second preprocessing circuits 200a and 200b supply complementary electrical signals of opposite logic states to the first and second LEDs 202a and 202b to cause the LEDs 202a and 202b to emit light alternatingly. The optical signals OS1 and OS2 generated in this manner are converted into the linearly polarized optical signals OS3 and OS4 whose polarizing angles differ from each other by 90 degrees by the first and second polarizers 204a and 204b. The optical signals OS3 and OS4 are emitted into space.

The optical signals OS3 and OS4 emitted in this manner arrive at the main device 12 through space to be incident on the first and second optical systems 230 and 208, respectively. The signal processing in the main device 12 will be described with reference to FIG. 23. The direction in a circle of FIG. 23 represents the polarizing angle. It is assumed that the polarizing angle of the first polarizer 204a is set in the vertical direction, and that the polarizing angle of the second polarizer 204b is set in the horizontal direction. In addition, it is assumed that a polarizing angle corresponding to the maximum transmittance of the first optical system 230 is set in the vertical direction, and that a polarizing angle corresponding to the maximum transmittance of the second optical system 208 is set in the horizontal direction. In this case, only the optical signal OS3 is transmitted through the first optical system 230, while only the optical signal OS4 is transmitted through the second optical system 208.

With this operation, an electrical signal ES1 corresponding to the optical signal OS3 is output from the first photodiode 210, and an electrical signal ES2 corresponding to the optical signal OS4 is output from the second photodiode 212.

Since the first and second LEDs 202a and 202b alternatingly emit light, the optical signals OS3 and OS4 have opposite logic states, as shown in FIG. 23. Therefore, the logic states of the electrical signals ES1 and ES2 are also opposite to each other, as shown in FIG. 23.

When the electrical signals ES1 and ES2 having such a relationship are amplified by the differential amplifier 218, the two signals are combined together to obtain a bipolar electrical signal ES3 with "0" set as a reference value. This electrical signal ES3 is a signal from which signal components corresponding to the external disturbing light have been removed by the same operation as described in the ninth embodiment.

According to the tenth embodiment, therefore, signal components can be extracted without being influenced by the external disturbing light, and the same effects as those in the ninth embodiment can be obtained. Moreover, since a signal with "0" set as a central value is always obtained by the main device 12, a threshold value for the restoration (binarization) of signals in the post-processing circuit 220 can be fixed to "0".Because of this reason, unlike the eighth and ninth embodiments in which the threshold value must be set to an optimal value in accordance with the intensity of the received light, in the tenth embodiment, such a threshold value setting operation is not required. In addition, since the emission operations of light from the first and second LEDs 202a and 202b are separately controlled, ternary (positive, negative, zero) data transmission can be performed.

According to the eighth to tenth embodiments, since the external disturbing light is removed and signal components corresponding to the optical signal emitted from the hand scanner 14 can be extracted without being influenced by the external disturbing light. Therefore, a large volume of data transmission can be accurately performed at a high speed without being influenced by environmental conditions, and the data transmission system can be used under various conditions. Further, it is sufficient for the optical signal to have a given polarization characteristic. The signal extraction can be performed without regard to the wavelengths and modulation frequencies. Thus, the format of the optical signal can be freely determined.

Various modifications of the eighth to tenth embodiments will be described.

(1) In the eighth to tenth embodiments, the first and second photodiodes 210 and 212 are formed adjacent to each other on the same base 224 to be integrated into a single chip. However, it is only required that the main device 12 includes the first and second photodiodes 210 and 212, but they need not be integrated into a single chip.

(2) In the eighth to tenth embodiments, the polarizing angle of light emitted from the hand scanner 14 is set to coincide with the polarizing angle corresponding to the maximum transmittance of one of the optical systems 206 (or 230) and 208 in the hand scanner 12. These polarizing angles need not always coincide with each other. However, it is preferable that the polarizing angle of the optical signal emitted from the hand scanner 14 be set to coincide with the polarizing angle corresponding to the maximum transmittance of one of the optical systems in the main device 12, because the light-receiving sensitivity is improved to increase the S/N ratio.

(3) In the eighth to tenth embodiments, an optical signal emitted from the hand scanner 14 has linear polarization characteristics. However, it is only required that at least an optical component having a predetermined polarizing angle have a better polarization characteristic than optical components having other polarizing angles. For example, elliptically polarized light may be used.

(4) when the polarizing angle of an optical signal emitted from the hand scanner 14 is to coincide with the polarizing angle corresponding to the maximum transmittance of one of the optical systems in the main device 12, as in the eighth to tenth embodiments, if the hand scanner and the main device are not relatively horizontal, the polarizing angle of an optical signal emitted from the hand scanner may differ from the polarizing angle corresponding to the maximum transmittance of one of the optical systems in the main device. Therefore, if there is a possibility that the horizontal relationship between the hand scanner and the main device cannot be established, at least the polarizers and the analyzers in the optical systems may always be set in a predetermined state with reference to the vertical direction (the vertical direction being 0 degree) regardless of the positional relationship of the hand scanner and the main device. For example, this can be realized by employing a structure in which the polarizers or the analyzers in the optical systems are rotatably supported, while counterweights are attached to the polarizers or the analyzers to keep them in the vertical direction.

(5) The main device 12 may be designed such that four photodiodes 240, 242, 244, and 246 are formed on a single base 248 to be integrated in the form of a matrix, and analyzers constituted by four checkerboard regions 250, 252, 254, and 256 having different analyzing angles are bonded to the respective elements. In this case, if outputs from the two photodiodes 240 and 246, or 242 and 244 corresponding to the same polarizing angle are added together, and the resultant signal is output, the amounts of light incident on the elements corresponding to the respective polarizing angles can be made uniform regardless of the incident directions of light.

(6) In the eighth to tenth embodiments, the two optical systems of the main device are arranged adjacent to each other so that light rays incident on the two optical systems become almost the same. However, light may be split into two light rays, as shown in FIG. 25, by a light splitting element, such as a half mirror 260, so that the split light rays are incident on the two optical systems.

(7) In the ninth embodiment shown in FIG. 21 and the tenth embodiment shown in FIG. 22, the first and second optical systems 230 and 208 have the same structure, and only their polarizing directions are set to be different. However, they may have different structures. In addition, the first optical system 230 may not have polarization dependency, and only its attenuation characteristic may be set to be the same as that of the second optical system 208.

(8) In the ninth and tenth embodiments, the difference in polarizing angle between the two optical systems 230 and 208 is set to be 90 degrees. However, the difference may not be 90 degrees.

(9) In the tenth embodiment, a complemental optical signals OS3 and OS4 having different polarization states are produced by the first and second polarizers 204a and 204b. The same optical signals can be produced, as shown in FIG. 26, by using a Faraday element 270 which changes the polarization state of the light in accordance with the image data. An LED 272 is always turned on to emit non-polarized light showing no polarization characteristics. The non-polarized light is converted into linearly polarized light by a polarizer 274. This linearly polarized light is transmitted through the Faraday element 270 which is applied with the magnetic field in accordance with the image data. If the magnetic field is applied when the image data is "1", the polarization state of the light is changed by 90 degrees. When the image data is "0", the polarization state of the light is not changed. Therefore, the two optical signals OS3 and OS4 of the tenth embodiment can be produced by using a single optical system formed of the LED 272, polarizer 274, and Faraday element 270.

According to the present invention, there is provided an image reading apparatus with a separated scanner which can freely scan an original being disturbed by a cord connecting the scanner to a main device and which can increase the operability of the scanner.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the above embodiments, the transmission of digital signals is exemplified. However, the present invention can be applied to the transmission of analog signals.

What is claimed is:

1. An image reading apparatus comprising scanner means for reading image data of an original, and a main device for processing the image data supplied from said scanner means, said scanner means comprising means for emitting a polarized light in accordance with the image data, a signal component of a first polarization angle having a level higher than a signal components of other polarization angles, and said main device comprising:
first receiver means for generating a first electrical signal having a level corresponding to an amount of incident light regardless of a polarization characteristic;
an optical system in which a transmittance for a second polarizing angle is higher than a transmittance for other polarizing angles;
second receiving means for generating a second electrical signal having a level corresponding to an amount of light transmitted through said optical system;
means for amplifying at least one of the first and second electrical signals by first and second amplification factors such that a difference between the first and second amplification factors has a predetermined level for compensating for an attenuation amount of light transmitted through said optical system; and
level difference calculating means for calculating a level difference between the first and second electrical signals upon amplification by said amplifying means.

2. An apparatus according to claim 1, wherein said first polarizing angle equals to said second polarizing angle.

3. An apparatus according to claim 1, wherein said first and second receiving means are arranged adjacent to each other such that there is no substantial difference in the amount of light incident on said first and second receiving means.

4. An apparatus according to claim 1, wherein said main device comprises means for slitting incident light into light rays to be incident on said first receiving means and said optical system.

5. An image reading apparatus comprising scanner means for reading image data of an original, and a main device for processing the image data supplied from said scanner means,
said scanner means comprising means for emitting a polarized light in accordance with the image data, a signal component of a first polarization angle having a level higher than a signal components of other polarization angles, and
said main device comprising:
a first optical system in which a transmittance for a second polarizing angle is higher than a transmittance for other polarizing angles;
first receiver means for generating a first electrical signal having a level corresponding to an amount of light transmitted through said first optical system;
a second optical system in which a transmittance for the second polarizing angle differs from the transmittance for the second polarizing angle of said first optical system and a transmittance for a non-polarized light equals to the transmittance for the non-polarized light said first optical system;
second receiving means for generating a second electrical signal having a level corresponding to an amount of light transmitted through said second optical system; and
level difference calculating means for calculating a level difference between the first and second electrical signals.

6. An apparatus according to claim 5, wherein said first polarizing angle equals to said second polarizing angle.

7. An apparatus according to claim 5, wherein said first and second receiving means are arranged adjacent to each other such that there is no substantial difference in the amount of light incident on said first and second receiving means.

8. An apparatus according to claim 5, wherein said main device comprises means for slitting incident light into light rays to be incident on said first and second optical systems.

9. An image reading apparatus comprising scanner means for reading image data of an original, and a main device for processing the image data supplied from said scanner means,
said scanner means comprising means for emitting a polarized light in accordance with the image data, a signal component of a first polarization angle having a level higher than a signal components of other polarization angles, and
said main device comprising:
a first optical system in which a transmittance for a second polarizing angle is higher than a transmittance for other polarizing angles;
first receiver means for generating a first electrical signal having a level corresponding to an amount of light transmitted through said first optical system;
a second optical system in which a transmittance for a third polarizing angle is higher than a transmittance for other polarizing angles;
second receiving means for generating a second electrical signal having a level corresponding to an amount of light transmitted through said second optical system; and
level difference calculating means for calculating a level difference between the first and second electrical signals.

10. An apparatus according to claim 9, wherein said first polarizing angle equals to one of said second and third polarizing angles.

11. An apparatus according to claim 9, wherein said second polarizing angle differs from said third polarizing angle by 90 degrees.

12. An apparatus according to claim 9, wherein said first and second receiving means are arranged adjacent to each other such that there is no substantial difference in the amount of light incident on said first and second receiving means.

13. An apparatus according to claim 9, wherein said main device comprises means for slitting incident light into light rays to be incident on said first and second optical systems.

14. An image reading apparatus comprising scanner means for reading image data of an original, and a main device for processing the image data supplied from said scanner means,
said scanner means comprising:
first means for emitting a polarized light in accordance with the image data, a signal component of a first polarization angle having a level higher than a signal components of other polarization angles; and
second means for emitting a polarized light in accordance with the image data, a signal component of a second polarization angle having a level higher than a signal components of other polarization angles, and said main device comprising:
- a first optical system in which a transmittance for a third polarizing angle is higher than a transmittance for other polarizing angles;
- first receiver means for generating a first electrical signal having a level corresponding to an amount of light transmitted through said first optical system;
- a second optical system in which a transmittance for a fourth polarizing angle is higher than a transmittance for other polarizing angles;
- second receiving means for generating a second electrical signal having a level corresponding to an amount of light transmitted through said second optical system; and
- level difference calculating means for calculating a level difference between the first and second electrical signals.

15. An apparatus according to claim 14, wherein said first polarizing angle equals to one of said third and fourth polarizing angles and said second polarizing angle equals to the other of said third and fourth polarizing angles.

16. An apparatus according to claim 15, wherein said first polarizing angle differs from said second polarizing angle by 90 degrees.

17. An apparatus according to claim 14, wherein said first and second receiving means are arranged adjacent to each other such that there is no substantial difference in the amount of light incident on said first and second receiving means.

18. An apparatus according to claim 14, wherein said main device comprises means for slitting incident light into light rays to be incident on said first and second optical systems.

19. An image reading apparatus comprising scanner means for reading image data of an original, and a main device for processing the image data supplied from said scanner means, said main device connected to said scanner means through a wireless channel,
    said main device comprising means for returning the image data transmitted from said scanner means to said scanner means, and
    said scanner means comprising:
    - means for storing the image data transmitted to said main device;
    - means for comparing the image data returned from said main device and the image data stored in said storing means; and
    - means for retransmitting the image data stored in said storing means when said comparing means detects non-coincidence of the image data.

20. An apparatus according to claim 19, wherein said scanner means is connected to said main device by means of an optical communication channel.

21. An apparatus according to claim 19, wherein said scanner means is connected to said main device by means of a radio communication channel.

22. An image reading apparatus comprising scanner means for reading image data of an original, and a main device for processing the image data supplied from said scanner means,
    said scanner means comprising:
    - means for transmitting the image data with address data and an error correcting flag through a wireless channel; and
    - means for storing the image data and the address data,
    said main device comprising:
    - means for detecting a transmission error of the image data transmitted from said scanner means based on the error correcting flag; and
    - means for transmitting a retransmission request signal to said scanner means when said detecting means detects the transmission error.

23. An apparatus according to claim 22, wherein said scanner means is connected to said main device by means of an optical communication channel.

24. An apparatus according to claim 22, wherein said scanner means is connected to said main device by means of a radio communication channel.

25. An apparatus according to claim 22, wherein said error correcting flag is a cyclic redundancy check flag.

26. An apparatus according to claim 22, wherein
    said main device comprises means for transmitting the retransmission request signal to said scanner means with a serial number and a second error correcting flag, and
    said scanner means comprises:
    - first means for detecting a discontinuity of the serial number of the retransmission request signal from said main device;
    - means for transmitting an interrupted serial number to said main device when said first means detects the discontinuity of the serial number to make the main device transmit the retransmission request signal corresponding to the image data having the interrupted serial number;
    - second means for detecting a transmission error of the retransmission request signal from said main device based on the second error correcting flag; and
    - means for transmitting an address data to said main device when said second means detects the transmission error to make the main device transmit the retransmission request signal corresponding to the image data having the address data.

27. An image reading apparatus comprising scanner means for reading image data of an original, and a main device for processing the image data supplied from said scanner means,
    said scanner means comprising means for transmitting the image data after performing an error correcting coding through a wireless channel, and
    said main device comprising means for performing an error correcting decoding on the image data transmitted from said scanner means.

28. An apparatus according to claim 27, wherein said scanner means is connected to said main device by means of an optical communication channel.

29. An apparatus according to claim 27, wherein said scanner means is connected to said main device by means of a radio communication channel.

30. An image reading apparatus comprising:
    scanner means which is manually moved on an original for reading image data of the original; and
    a main device for processing the image data supplied from the scanner means, wherein
    said scanner means comprising means for transmitting the image data to said main device through a wireless channel, said main device comprising means for receiving the image data transmitted from said scanner means through the wireless channel, and said scanner means is connected to said main device by means of an optical communication channel.

31. An apparatus according to claim 30, wherein said scanner means comprises a line sensor for reading the image data line by line, a housing for containing the line sensor, and plural transmitters arranged on plural surfaces of the housing, the image data being able to be transmitted from any of the plural transmitters.

32. An apparatus according to claim 30, wherein said main device comprises second transmitter means for transmitting a control signal to said scanner means through the wireless channel, and said scanner means comprises second receiver means for receiving the control signal transmitted from said second transmitting means.

* * * * *